(12) United States Patent
Muthukaruppan et al.

(10) Patent No.: US 11,159,424 B2
(45) Date of Patent: Oct. 26, 2021

(54) NETWORKING AGGREGATION LINK PROVISIONING SYSTEM

(71) Applicant: Dell Products L.P., Round Rock, TX (US)

(72) Inventors: Senthil Nathan Muthukaruppan, Chennai (IN); Pugalendran Rajendran, Tamil Nadu (IN); Rajesh Srinivasulu, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 16/666,932

(22) Filed: Oct. 29, 2019

(65) Prior Publication Data
US 2021/0126856 A1    Apr. 29, 2021

(51) Int. Cl.
*H04L 12/709* (2013.01)
*H04L 12/46* (2006.01)
*H04L 12/761* (2013.01)
*H04L 12/24* (2006.01)

(52) U.S. Cl.
CPC ........ *H04L 45/245* (2013.01); *H04L 12/4641* (2013.01); *H04L 45/16* (2013.01); *H04L 41/0654* (2013.01)

(58) Field of Classification Search
CPC ..... H04L 45/28; H04L 69/40; H04L 12/4641; H04L 67/1002; H04L 12/66; H04L 45/22; H04L 45/245; H04L 47/825; G06F 11/1451; G06F 11/2023; G06F 11/2094; G06F 11/2005; G06F 11/2007; G06F 11/2069; G06F 11/2089; G06F 11/2092
See application file for complete search history.

(56) References Cited

U.S. PATENT DOCUMENTS

| 6,202,169 | B1 * | 3/2001 | Razzaghe-Ashrafi ........... G06F 11/20 714/1 |
| 6,910,149 | B2 * | 6/2005 | Perloff ................ H04L 43/0811 370/225 |
| 10,445,295 | B1 * | 10/2019 | Han ...................... G06F 16/178 |

(Continued)

*Primary Examiner* — Tonia L Dollinger
*Assistant Examiner* — Linh T. Nguyen
(74) *Attorney, Agent, or Firm* — Joseph Mencher

(57) ABSTRACT

A networking aggregation link provisioning system includes a second aggregated networking device that is configured to provide a second portion of a link aggregation to a connected device, and a first aggregated networking device that is configured to provide a first portion of the link aggregation to the connected device. The first aggregated networking device establishes an inter-aggregated-networking-device link with the second aggregated networking device and, in response, synchronizes first aggregated networking device process(es) running in the first aggregated networking device with respective corresponding second aggregated networking device process(es) running in the second aggregated networking device. When the first aggregated networking device determines that the synchronization of the first aggregated networking device process(es) with the respective corresponding second aggregated networking device process(es) has completed, its causes the second aggregated networking device to enable the second portion of the link aggregation to the connected device.

17 Claims, 14 Drawing Sheets

(56) References Cited

U.S. PATENT DOCUMENTS

| | | | | |
|---|---|---|---|---|
| 2001/0033548 A1* | 10/2001 | Saleh | .................. | H04L 45/22 |
| | | | | 370/218 |
| 2002/0099972 A1* | 7/2002 | Walsh | .................. | G06F 11/2005 |
| | | | | 714/10 |
| 2010/0020680 A1* | 1/2010 | Salam | .................. | H04L 41/0663 |
| | | | | 709/223 |
| 2014/0056122 A1* | 2/2014 | Singal | .................. | H04L 45/28 |
| | | | | 370/220 |
| 2016/0112549 A1* | 4/2016 | Zhou | .................. | H04L 45/24 |
| | | | | 370/216 |
| 2017/0279667 A1* | 9/2017 | Culter | .................. | H04L 41/0672 |
| 2019/0166198 A1* | 5/2019 | Wang | .................. | H04L 41/0695 |
| 2019/0239276 A1* | 8/2019 | Virtanen | .................. | H04W 76/18 |
| 2020/0336368 A1* | 10/2020 | Akkineni | .................. | H04L 41/082 |

\* cited by examiner

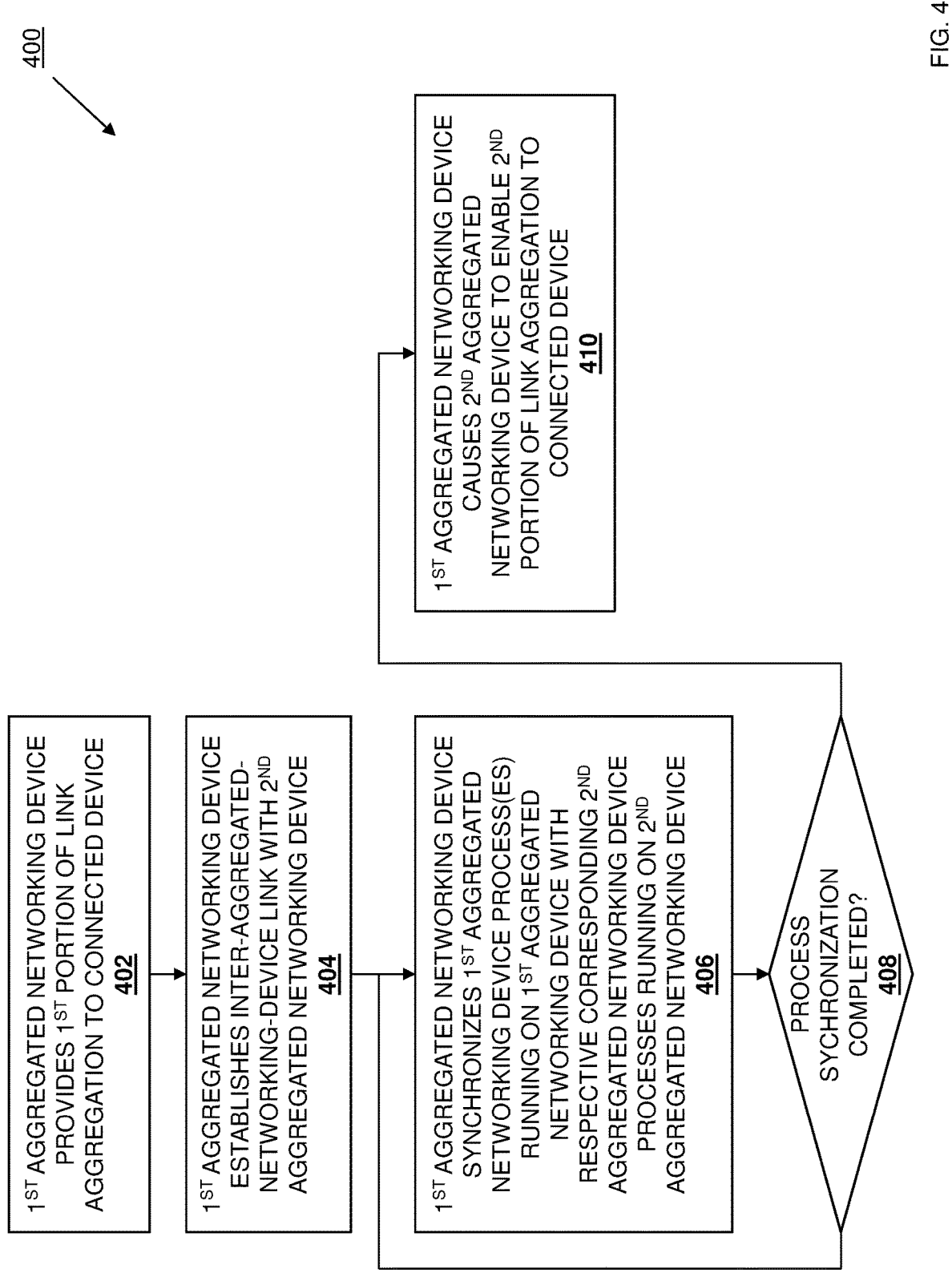

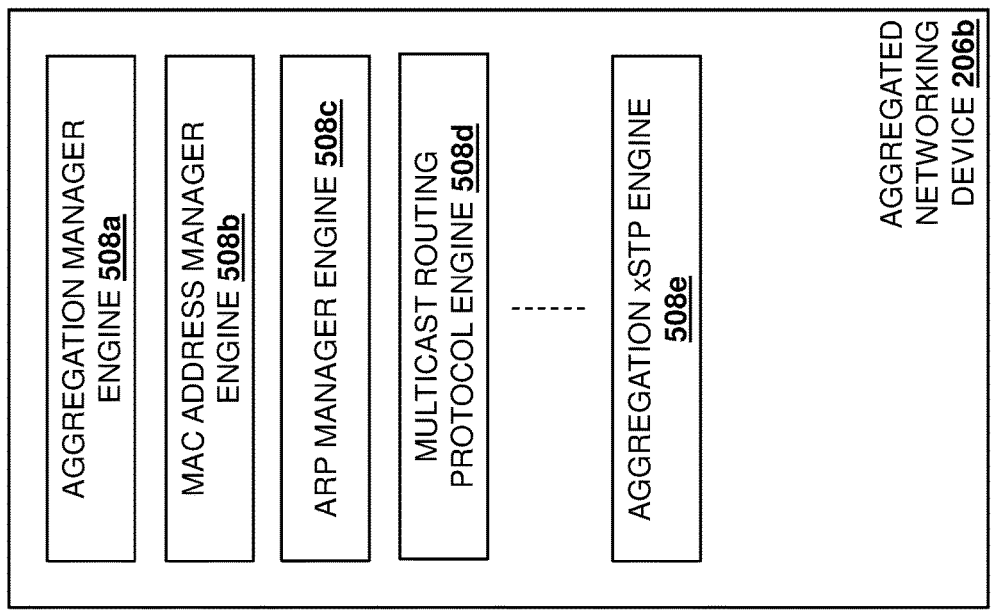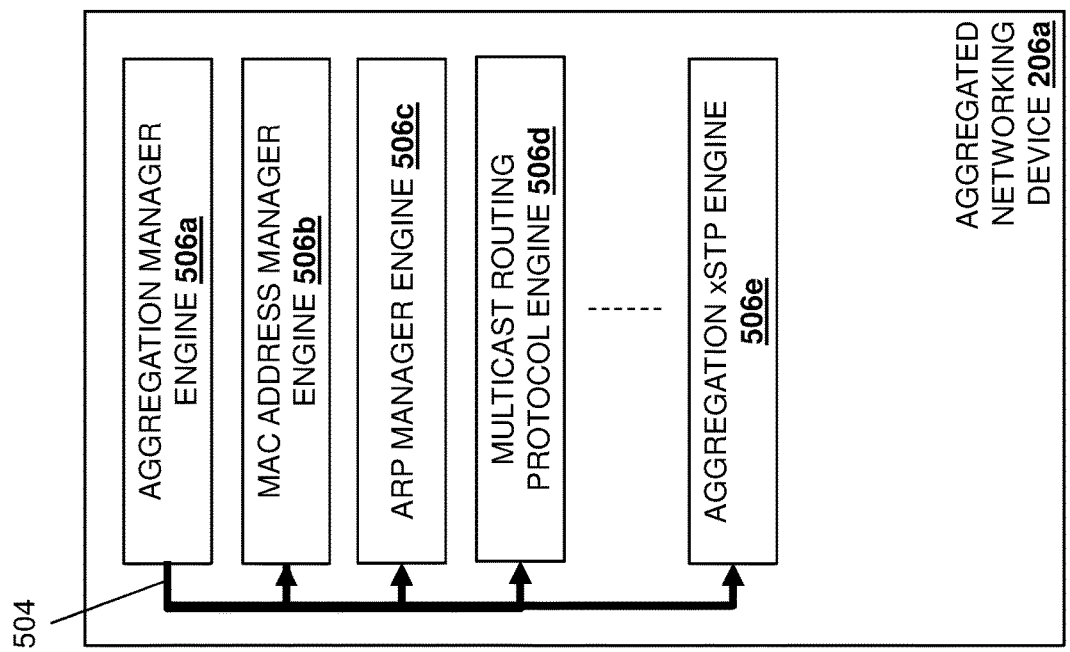
FIG. 5E

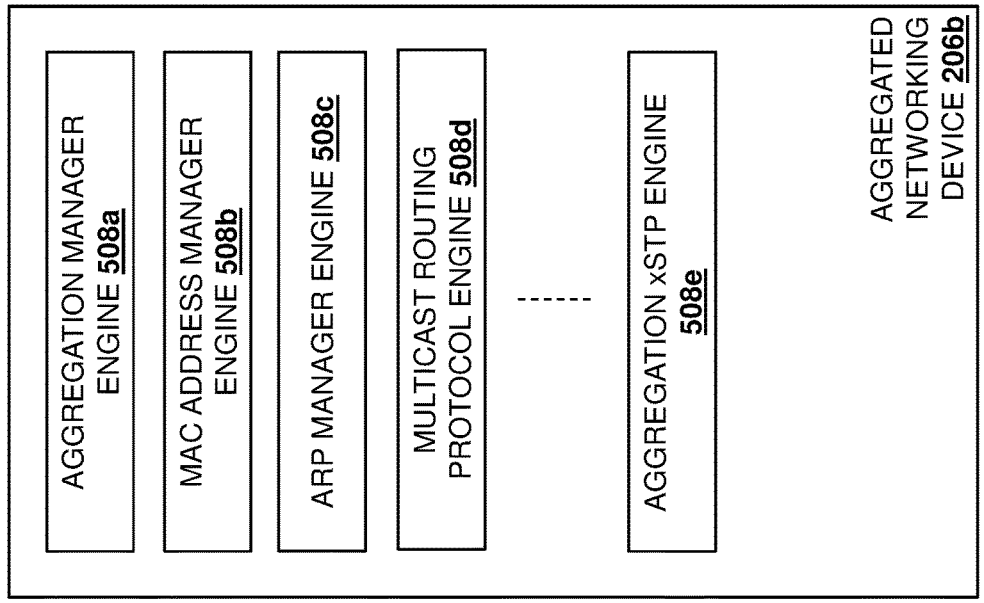
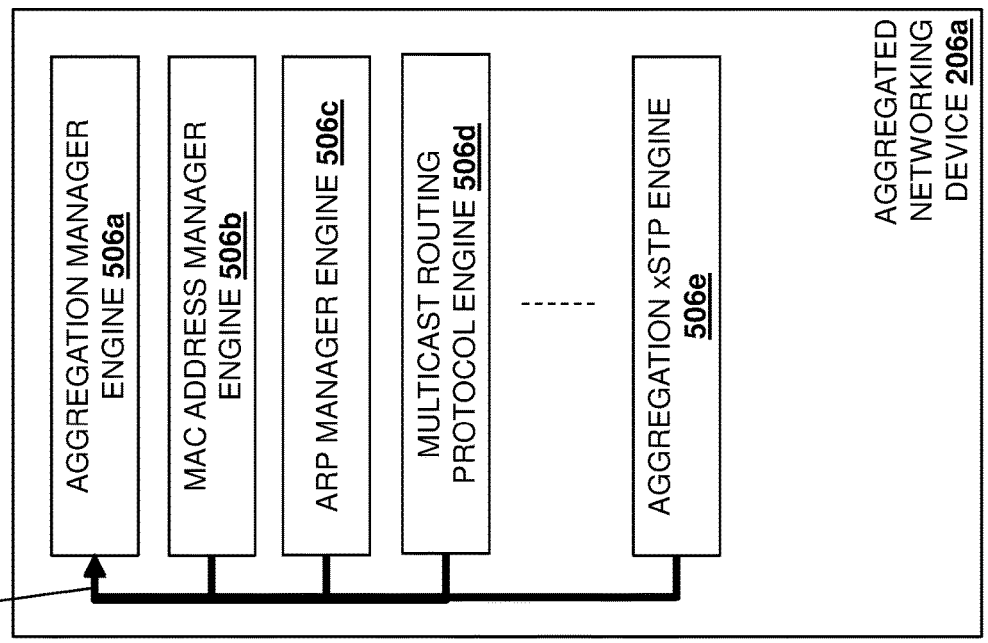
FIG. 5H

NETWORKING AGGREGATION LINK PROVISIONING SYSTEM

BACKGROUND

The present disclosure relates generally to information handling systems, and more particularly to provisioning links available via aggregated networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, are sometimes provided in networking aggregation systems. For example, multiple networking devices may provide a networking aggregation system via the utilization of the Virtual Link Trunking (VLT) protocol, which one of skill in the art in possession of the present disclosure will recognize is a proprietary aggregation protocol available in switch devices provided by DELL® Inc. of Round Rock, Tex., United States, and operates to provide a redundant, load-balancing connection in a loop-free environment that eliminates the need to use the Spanning Tree Protocol (STP), as well as including other VLT functionality known in the art. As such, in specific examples involving the VLT protocol, the networking aggregation system may include a VLT domain provided by the networking devices that are referred to as VLT peer devices, with each of those VLT peer devices connected together via a plurality of inter-networking-device/inter-VLT-peer-device links that may be aggregated into a Link Aggregation Group (LAG) that is referred to as an Inter-Chassis Link (ICL) or VLT interconnect (VLTi). Furthermore, each of the VLT peer devices may be connected to a Top Of Rack (TOR) switch device via respective links that may be aggregated to provide a LAG that is referred to as a VLT LAG, with that VLT LAG provided by VLT ports that are included on the VLT peer devices and provided as part of a VLT port channel, and with that TOR switch device coupled to one or more host devices. Finally, the VLT peer devices may be connected to one or more core switch devices that provide access to other devices via a network.

Networking aggregation systems sometimes experience link or link aggregation failures or other unavailability. For example, in the VLT domain discussed above, the ICL/VLTi between the VLT peer devices may fail or otherwise become unavailable, thus preventing data transmission between the VLT peer devices. In order to address such failure/unavailability scenarios, one of the VLT peer devices may have been previously elected as a primary VLT peer device, with the other VLT peer device having been designated as a secondary VLT peer device. Thus, in conventional VLT domains, in response to the failed/unavailable ICL/VLTi, the secondary VLT peer device may bring down its VLT ports that are provided as part of the VLT port channel that provides the VLT LAG with the TOR switch device. Subsequently, in response to the recovery or other availability of the ICL/VLTi between the VLT peer devices, link provisioning operations may be performed in which the secondary VLT peer device begins a timer and, upon expiration of a user-defined link provisioning time period, will operate to bring up its VLT ports that are part of the VLT port channel that provides the VLT LAG with the TOR switch device. Similarly, when a VLT peer device is added to the VLT domain (i.e., as a secondary VLT peer device), it will begin the timer and, upon expiration of the user-defined link provisioning time period, will operate to bring up its VLT ports that are part of the VLT port channel that provides the VLT LAG with the TOR switch device.

The purpose of the timer, and the waiting for the user-defined link provisioning time period to bring up VLT ports that are part of the VLT port channel that provides the VLT LAG with the TOR switch device, is to provide an amount of time that is sufficient for processes running in the primary VLT peer device and the secondary VLT peer device to complete synchronization operations so that each operates correctly in providing the VLT LAG with the TOR switch device. In conventional VLT domains, a default user-defined link provisioning time period of 90 seconds may be provided, but may be adjusted based on the configuration of the VLT domain (e.g., a number of Virtual Local Area Networks (VLANs), Media Access Control (MAC) addresses, Layer 2 (L3) routes, Internet Group Management Protocol (IGMP) snooping routes, multicast routes, and/or other configurable characteristics of the VLT domain) As will be appreciated by one of skill in the art in possession of the present disclosure, if a user-defined link provisioning time period is defined that is not sufficient to allow the processes running in the VLT peer devices to completely the synchronization operations and completely configure the VLT ports on the secondary VLT peer device that are part of the VLT port channel that provides the VLT LAG with the TOR switch device, data traffic transmitted by the TOR switch device may be dropped by the secondary VLT peer device.

Furthermore, if a user-defined link provisioning time period is defined that is more than the time required for the processes running in the VLT peer devices to complete the synchronization operations and completely configure the VLT ports on the secondary VLT peer device that are part of the VLT port channel that provides the VLT LAG with the TOR switch device, those VLT ports on the secondary VLT peer device will remain unavailable for longer than necessary, thus reducing the bandwidth of the VLT LAG provided by the VLT port channel. Conventional networking aggregation systems/VLT domains attempt to address this problem by requiring the user or administrator of the networking aggregation system/VLT domain to perform a manual, time intensive, iterative process to adjust the user-defined link provisioning time period until it is appropriate for their networking aggregation system/VLT domain. As such, networking aggregation system users/administrators may be required to spend relatively significant time periods determining an appropriate user-defined link provisioning time period for their networking aggregation systems/VLT domains, or may simply accept any user-defined link provisioning time period that results in the proper operation of their networking aggregation system/VLT domain, even when that user-defined link provisioning time period reduces the bandwidth of that networking aggregation system/VLT domain for longer than is necessary.

Accordingly, it would be desirable to provide networking aggregation link provisioning system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an aggregation manager engine that is configured to: provide a first portion of a link aggregation to a connected device; establish, with an aggregated networking device, an inter-aggregated-networking-device link; synchronize, with the aggregated networking device in response to establishing the inter-aggregated-networking-device link, at least one first aggregated networking device process run by the processing system with a respective corresponding second aggregated networking device process running in the second aggregated networking device; and determine that the synchronization of the at least one first aggregated networking device process with the respective corresponding second aggregated networking device process has completed and, in response, cause the second aggregated networking device to enable a second portion of the link aggregation to the connected device.

BRIEF DESCRIPTION OF THE DRAWINGS

FIG. 4 is a flow chart illustrating an embodiment of a method for provisioning links in a networking aggregation system.

FIG. 5E is a schematic view illustrating an embodiment of aggregated networking devices in the networking aggregation link provisioning system of FIG. 2 operating during the method of FIG. 4.

FIG. 5H is a schematic view illustrating an embodiment of aggregated networking devices in the networking aggregation link provisioning system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
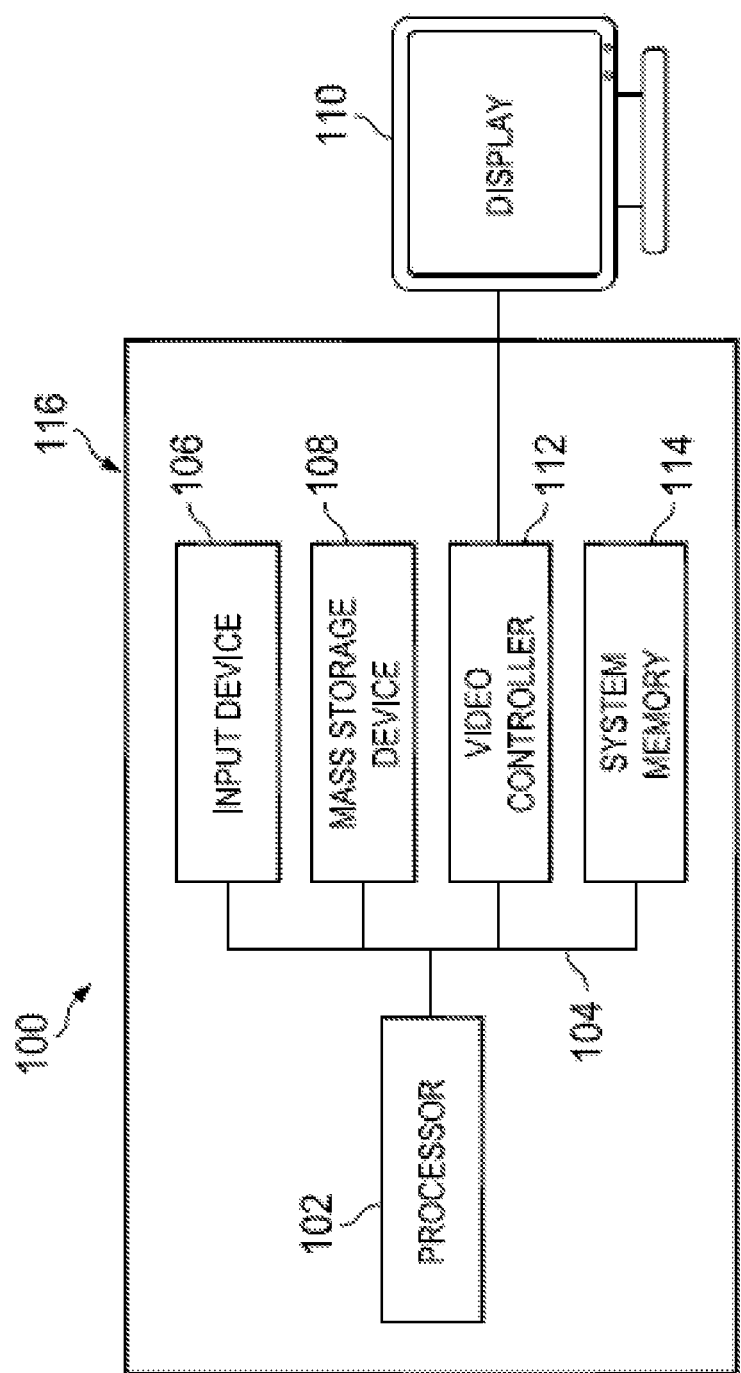
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
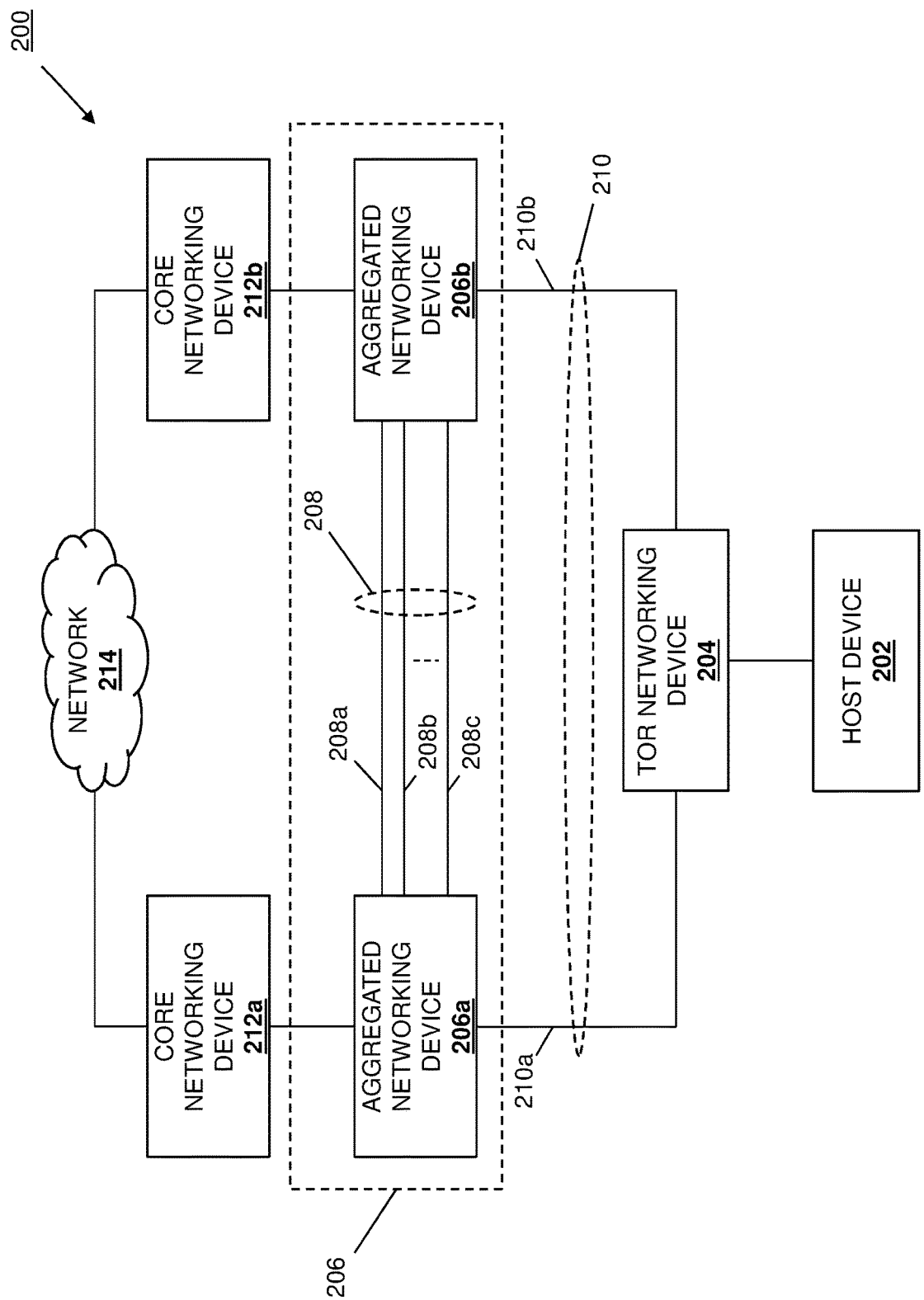
FIG. 2 is a schematic view illustrating an embodiment of a networking aggregation link provisioning system.

Referring now to FIG. 2, an embodiment of a networking aggregation link provisioning system 200 is illustrated. In the illustrated embodiment, the networking aggregation link provisioning system 200 incudes a host device 202. In an embodiment, the host device 202 may be provided by the IHS 100 discussed above with reference to FIG. 1, and/or may include some or all of the components of the IHS 100, and in specific examples may be provided by a server device included in a rack. However, while illustrated and discussed as a single server device included in a rack, one of skill in the art in possession of the present disclosure will recognize that host devices provided in the networking aggregation link provisioning system 200 may include any devices that may be configured to operate similarly as the host device 202 discussed below, and that more than one host device may be provided while falling within the scope of the present disclosure as well.

In the illustrated embodiment, the networking aggregation link provisioning system 200 incudes a Top Of Rack (TOR) networking device 204 that is coupled to the host device 202. In an embodiment, the TOR networking device 204 may be provided by the IHS 100 discussed above with reference to FIG. 1, and/or may include some or all of the components of the IHS 100, and in specific examples may be provided by a TOR switch device that is included in a rack that also houses a plurality of server devices (e.g., including a server device providing the host device 202.) However, while illustrated and discussed as a TOR switch device included in a rack, one of skill in the art in possession of the present disclosure will recognize that other devices provided in the networking aggregation link provisioning system 200 may include any devices that may be configured to operate similarly as the TOR switch device 202 discussed below while falling within the scope of the present disclosure as well.

In the illustrated embodiment, the networking aggregation link provisioning system 200 includes an aggregated networking device domain 206 that is provided by a pair of aggregated networking devices 206a and 206b that are coupled together by a plurality of inter-networking-device links 208a, 208b, and up to 208c that have been aggregated into an Inter-Chassis Link (ICL) 208. In the illustrated embodiment, the aggregated networking device 206a is coupled to the TOR networking device 204 by at least one link 210a, and the aggregated networking device 206b is coupled to the TOR networking device 204 by at least one link 210b, with the links 210a and 210b having been aggregated into a Link Aggregation Group (LAG) 210 between the TOR networking device 204 and the aggregated networking device domain 206. In an embodiment, either or both of the aggregated networking devices 206a and 206b may be provided by the IHS 100 discussed above with reference to FIG. 1, and/or may include some or all of the components of the IHS 100. For example, the aggregated networking devices 206a and 206b may be provided by a variety of aggregated switch devices that would be apparent to one of skill in the art in possession of the present disclosure.

In a specific example, the networking aggregation link provisioning system 200 may utilize the Virtual Link Trunking (VLT) protocol, which as discussed above is a proprietary aggregation protocol available in switch devices provided by DELL® Inc. of Round Rock, Tex., United States, and operates to provide a redundant, load-balancing connection in a loop-free environment that eliminates the need to use the Spanning Tree Protocol (STP), as well as including other VLT functionality known in the art. As such, with reference to FIG. 2, the aggregated networking device domain 206 may provide a VLT domain, with the aggregated networking devices 206a and 206b provided by VLT peer devices that are coupled together via the ICL 208 provided by a VLT interconnect (VLTi), and with the LAG 210 provided by a VLT LAG that couples the VLT peer devices to the TOR networking device 204. In the examples provided below, the aggregated networking device 206a is described as operating as a primary VLT peer device,=and the aggregated networking device 206b is described as operating as a secondary VLT peer device, with the aggregated networking device 206a/primary VLT peer device performing much of the functionality of method 400 discussed below. However, one of skill in the art in possession of the present disclosure will appreciate that the aggregated networking device 206b/secondary VLT peer device may perform the functionality described below for the aggregated networking device 206a/primary VLT peer device while remaining within the scope of the present disclosure as well.

In the illustrated embodiment, the networking aggregation link provisioning system 200 includes a pair of core networking devices 212a and 212b, with the core networking device 212a coupled to the aggregated networking device 206a, and the core networking device 212b coupled to the aggregated networking device 206b. In an embodiment, either or both of the core networking devices 212a and 212b may be provided by the IHS 100 discussed above with reference to FIG. 1, and/or may include some or all of the components of the IHS 100. For example, the core networking devices 212a and 212b may be provided by a variety of core switch devices that would be apparent to one of skill in the art in possession of the present disclosure. Furthermore, while a pair of core networking devices 212a and 212b are illustrated, one of skill in the art in possession of the present disclosure will recognize that a single core networking device may be provided in the networking aggregation link provisioning system 200 and coupled to both of the aggregated networking devices 206a and 206b while remaining within the scope of the present disclosure as well. While a specific networking aggregation link provisioning system 200 has been illustrated and described, one of skill in the art in possession of the present disclosure will recognize that the networking aggregation link provisioning system of the present disclosure may include a variety of components and component configurations while remaining within the scope of the present disclosure as well.

Figure 3:
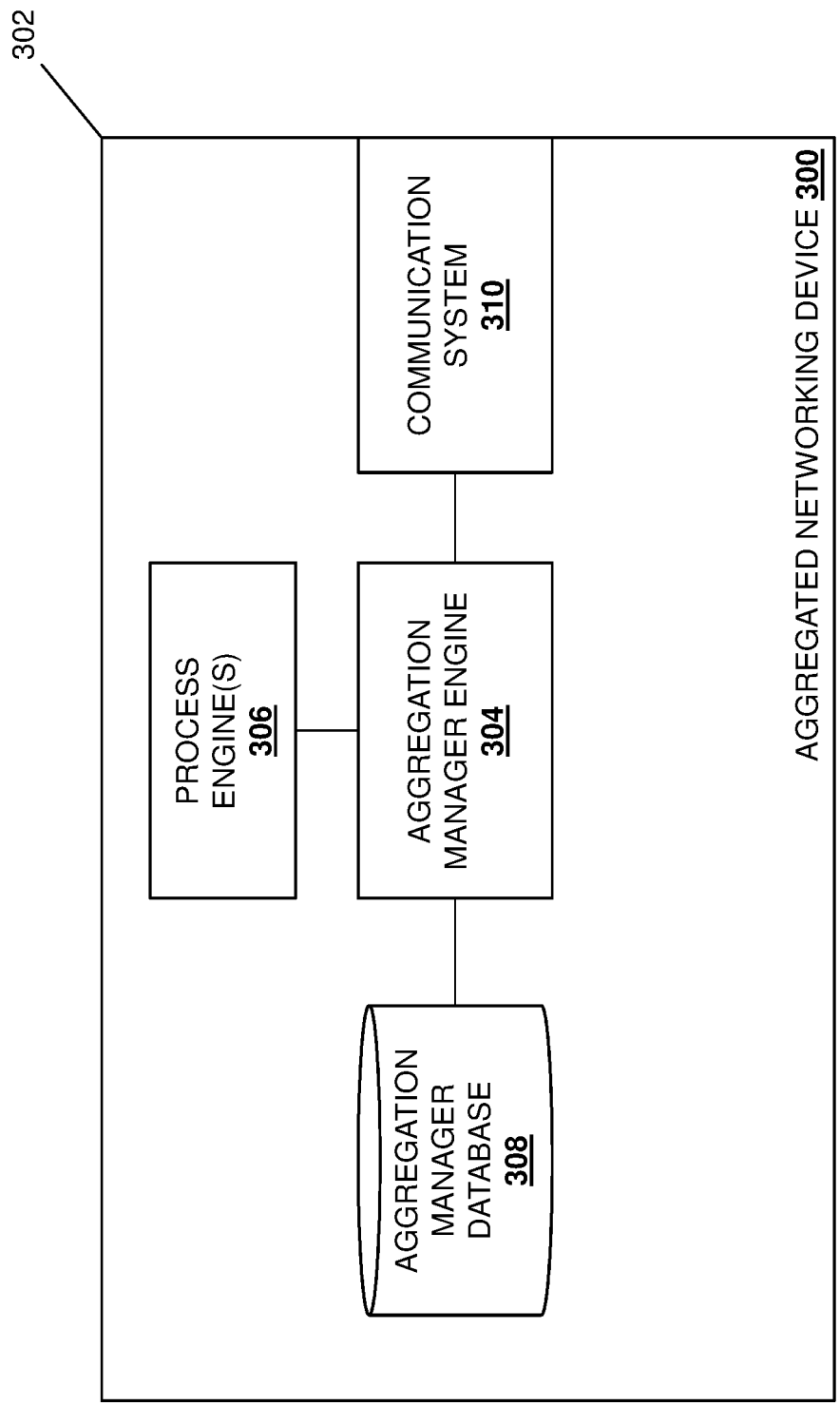
FIG. 3 is a schematic view illustrating an embodiment of an aggregated networking device that may be provided in the networking aggregation link provisioning system of FIG. 2.

Referring now to FIG. 3, an embodiment of an aggregated networking device 300 is illustrated that may provide either or each of the aggregated networking devices 206a and 206b discussed above with reference to FIG. 2. As such, the aggregated networking device 300 may be provided by the IHS 100 discussed above with reference to FIG. 1 and/or may include some or all of the components of the IHS 100. Furthermore, while illustrated and discussed as a aggregated switch device, one of skill in the art in possession of the present disclosure will recognize that the functionality of the aggregated networking device 300 discussed below may be provided by other devices that are configured to operate similarly as the aggregated networking device 300 discussed below. In the illustrated embodiment, the aggregated networking device 300 includes a chassis 302 that houses the components of the aggregated networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an aggregation manager engine 304 that is configured to perform the functionality of the aggregation manager engines and/or aggregated networking devices discussed below.

In addition, the memory system that is housed in the chassis 302 and coupled to the processing system may include instructions that, when executed by the processing system, cause the processing system to provide one or more process engines 306 that are configured to perform the functionality of the process engines and/or aggregated networking devices discussed below. In different embodiments, and as discussed in more detail in some of the examples provided below, the process engine(s) 306 may include a Media Access Control (MAC) address manager engine that provides a MAC address manager process, an Address Resolution Protocol (ARP) manager engine that provides an ARP manager process, a multicast routing protocol engine that provides a multicast routing protocol process, an aggregation Spanning Tree Protocol (xSTP) engine that provides an aggregation xSTP process, an Internet Group Management Protocol (IGMP) snooping engine that provides an IGMP snooping process, a Dynamic Host Configuration Protocol (DHCP) snooping engine that provides a DHCP snooping process, and/or other aggregated networking device processes that would be apparent to one of skill in the art in possession of the present disclosure.

The chassis 302 may also house a storage system (not illustrated, but which may include the storage 108 discussed above with reference to FIG. 1) that is coupled to the aggregation manager engine 304 (e.g., via a coupling between the storage system and the processing system) and that includes an aggregation manager database 308 that is configured to store any of the information utilized by the aggregation manager engine 304 discussed below. The chassis 302 may also house a communication system 310 that is coupled to the aggregation manager engine 304 (e.g., via a coupling between the communication system 310 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, one of skill in the art in possession of the present disclosure will appreciate that the communication system 310 may include ports that may be utilized to provide any of the links discussed above between the aggregated networking devices 206a and 206b, the TOR networking device 204, and the core networking devices 212a and 212b. While a specific aggregated networking device 300 has been illustrated, one of skill in the art in possession of the present disclosure will recognize that aggregated networking devices (or other devices operating according to the teachings of the present disclosure in a manner similar to that described below for the aggregated networking device 300) may include a variety of components and/or component configurations for providing conventional aggregated networking device functionality, as well as the functionality discussed below, while remaining within the scope of the present disclosure as well.

Referring now to FIG. 4, an embodiment of a method 400 for provisioning links in a networking aggregation system is illustrated. As discussed below, the systems and methods of the present disclosure provide for the provisioning of links between an aggregated networking device domain and a connected device via a deterministic synchronization of processes running in aggregated networking devices that provide the aggregated networking device domain. For example, an aggregated networking device domain may include a first aggregated networking device that is configured to provide a first portion of a link aggregation to a connected device, and a second aggregated networking device that is coupled to the first aggregated networking device and that is configured to provide a second portion of the link aggregation to the connected device. The first aggregated networking device may establish an inter-aggregated-networking-device link with the second aggregated networking device and, in response, synchronize at least one first aggregated networking device process running in the first aggregated networking device with a respective corresponding second aggregated networking device process running in the second aggregated networking device. When the first aggregated networking device determines that the synchronization of the at least one first aggregated networking device process with the respective corresponding second aggregated networking device process has completed, it may cause the second aggregated networking device to enable the second portion of the link aggregation to the connected device. As such, the second portion of the link aggregation to the connected device may be enabled as soon as synchronization operations for processes running on the first and second aggregated networking devices are completed and without the need for the user intervention discussed above to determine the time needed for those synchronization operations to complete, thus, ensuring proper operation of the aggregated networking device domain without reducing bandwidth available via the link aggregation for longer than is necessary.

The method 400 begins at block 402 where a first aggregated networking device provides a first portion of a link aggregation to a connected device. In an embodiment, at block 402, the aggregated networking device domain 206 of FIG. 2 may be provided with the aggregated networking device 206a providing the at least one link 210a as a first portion of a link aggregation that is provided by the LAG 210 between the TOR networking device 204 and the aggregated networking device domain 206. As will be appreciated by one of skill in the art in possession of the present disclosure, FIG. 2 illustrates the aggregated networking devices 206a and 206b providing the links 210a and 210b, respectively, as the first and second portions, respectively, of the link aggregation that is provided by the LAG 210 between the TOR networking device 204 and the aggregated networking device domain 206, and the examples illustrated below describe a situation in which the ICL 208 becomes unavailable such that the aggregated networking device 206b brings down the link(s) 210b that provide the second portion of the link aggregation that is provided by the LAG 210.

However, one of skill in the art in possession of the present disclosure will recognize that in other embodiments, the aggregated networking device 206a may provide the link(s) 210a to the TOR networking device 204 (which provide a first portion of a link aggregation that is to-be provided by the LAG 210 that will utilize those link(s) 210a), and the aggregated networking device 206b may be added to the aggregated networking device domain 206 (i.e., connected to the aggregated networking device 206a and the TOR networking device 204) such that the ICL 208 with the aggregated networking device 206a may be provided, and the link(s) 210b to the TOR networking device 204 may be provided as a second portion of the LAG 210 that includes the link(s) 210a. As such, the link(s) 210a provided between the aggregated networking device 206a and the TOR networking device 204 may be considered a first portion of the LAG 210 that includes the second portion provided by the links 210b between the aggregated networking device 206b and the TOR networking device 204, or may be considered a first portion of a LAG that will be provided when the links that provide the second portion of that LAG are available following the connection and link provisioning operations by the aggregated networking device 206b.

Figure 5A:
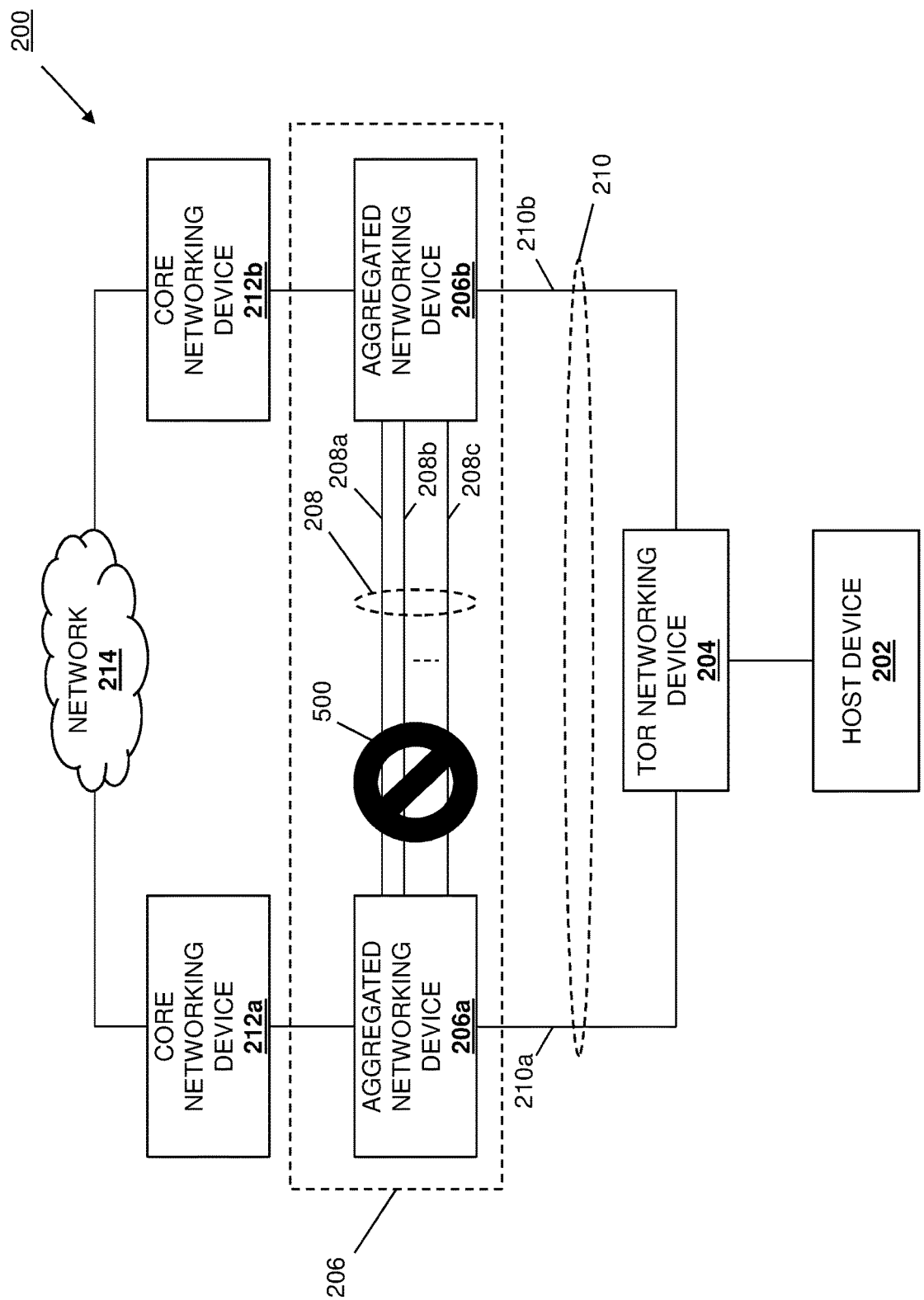
FIG. 5A is a schematic view illustrating an embodiment of the networking aggregation link provisioning system of FIG. 2 operating during the method of FIG. 4.
Figure 5B:
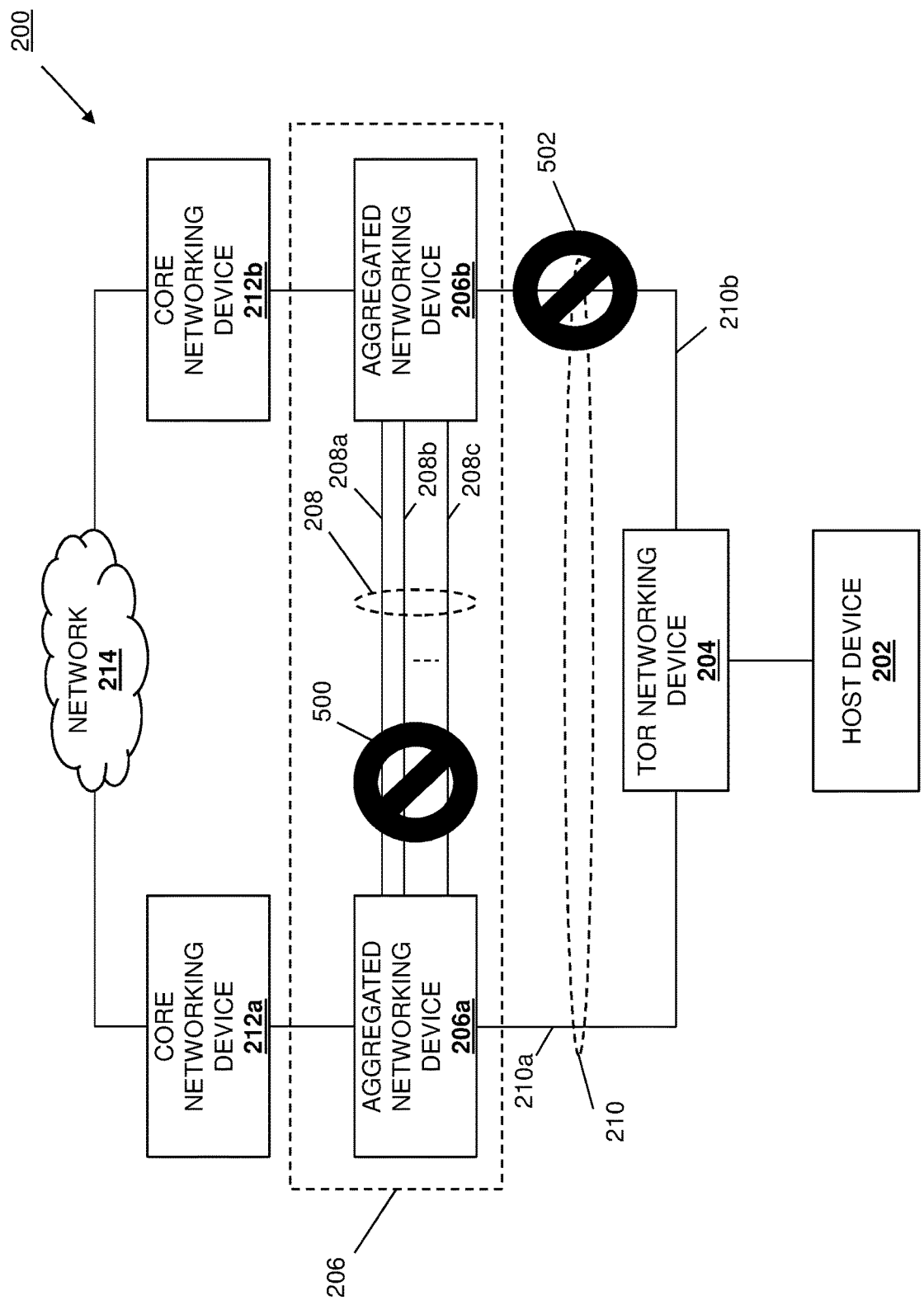
FIG. 5B is a schematic view illustrating an embodiment of the networking aggregation link provisioning system of FIG. 2 operating during the method of FIG. 4.
Figure 5C:
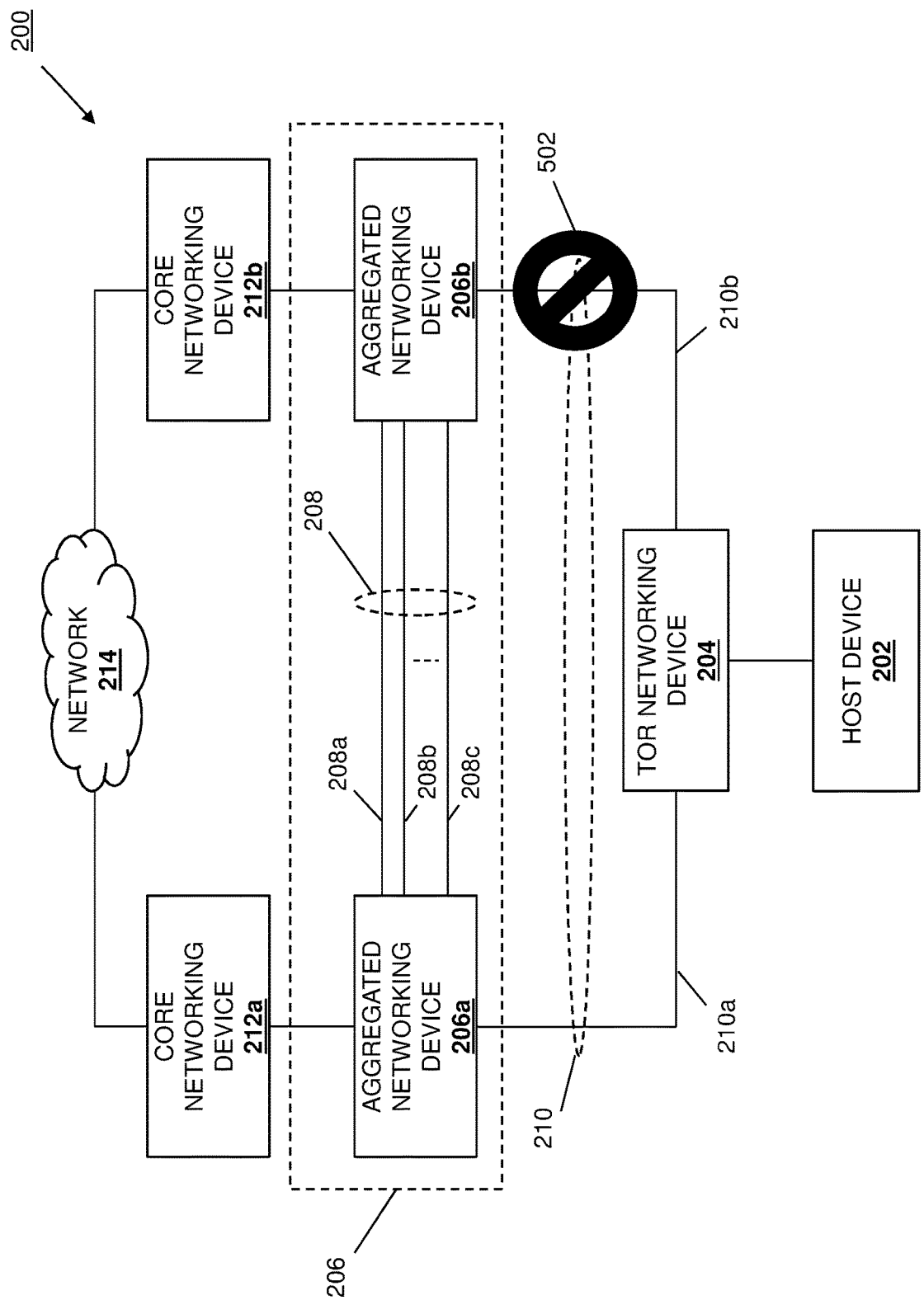
FIG. 5C is a schematic view illustrating an embodiment of the networking aggregation link provisioning system of FIG. 2 operating during the method of FIG. 4.

The method 400 then proceeds to block 404 where the first aggregated networking device establishes an inter-aggregated-networking-device link with a second aggregated networking device. As discussed above, in some embodiments, the aggregated networking devices 206a and 206b may be operating to provide the links 210a and 210b as part of the link aggregation provided by the LAG 210 between the aggregating networking device domain 206 and the TOR networking device 204 and, as illustrated in FIG. 5A, the ICL 208 may fail, "go down", and/or otherwise become unavailable (as illustrated by element 500.) As illustrated in FIG. 5B and as will be appreciated by one of skill in the art in possession of the present disclosure, in response to determining that the ICL 208 has failed, "gone down", and/or otherwise become unavailable, the aggregation manager engine 304 in the aggregated networking device 206b/300 may operate to disable the link(s) 210b that provide the second portion of the LAG 210 to the TOR networking device 204 (as illustrated by element 502.) Continuing with the specific example in which the aggregated networking device domain 206 is a VLT domain, in response to detecting a failed/unavailable VLTi provided by the ICL 208 (and, in some cases, verifying that a VLT heartbeat is "alive" or otherwise continues to exist), a secondary VLT peer device provided by the aggregated networking device 206b may bring down its VLT ports that are provided as part of the VLT port channel that provides the VLT LAG (i.e., the LAG 210) with the TOR networking device 204. As illustrated in FIG. 5C, following the disabling of the link(s) 210b that provide the second portion of the LAG 210, the ICL 208 may recover, "come up", and/or otherwise become available again following its unavailability (as illustrated by the lack of element 500 in FIG. 5C.)

As such, at block 404, the ICL 208 that provides the inter-aggregated-networking-device link may become available following some period of unavailability that resulted in the disablement of the link(s) 210b that provide the second portion of the LAG 210. In response, at block 404 the aggregation manager engine 304 in the aggregated networking device 206a/300 may operate to re-establish the ICL 208 with the aggregated networking device 206b. As will be appreciated by one of skill in the art in possession of the present disclosure, at block 404, the aggregation manager engine 304 in the aggregated networking device 206a/300 may operate to re-establish the ICL 208 following its unavailability using a variety of ICL-reestablishment techniques known in the art. Furthermore, one of skill in the art in possession of the present disclosure will recognize that the ICL 208 provides a bi-directional communications channel and, as such, at block 404 the aggregation manager engine 304 in the aggregated networking device 206b/300 may also operate to re-establish the ICL 208 following its unavailability using a variety of ICL-reestablishment techniques known in the art as well. Thus, in some embodiments of block 404, the aggregated networking devices 206 and 206b may exchange a variety of ICL reestablishment communications known in the art, and/or perform a variety of ICL reestablishment operations known in the art, in order to reestablish the ICL 208 between them following its unavailability.

As also discussed above, in other embodiments, the aggregated networking device 206a may be operating to provide the links 210a to the TOR networking device 204 when the aggregated networking device 206b is added to the aggregated networking device domain 206. As will be appreciated by one of skill in the art in possession of the present disclosure, immediately following the connection of the aggregated networking device 206b to the aggregated networking device domain 206 (e.g., via connections to the TOR networking device 205, the aggregated networking device 206a, and the core networking device 212b), the ICL 208 will be unavailable, and no links between the aggregated networking device 206b and the TOR networking device 204 will be available for the transmission of data. Continuing with the specific example in which the aggregated networking device domain 206 is a VLT domain, a secondary VLT peer device provided by the aggregated networking device 206b may be added to the VLT domain by connecting that secondary VLT peer device to the TOR networking device 204, the primary VLT peer device provided by the aggregated networking device 206a, and the core networking device 212b. Following the connection of the aggregated networking device 206b to the aggregated networking device domain 206, the ICL 208 may initialize, "come up", and/or otherwise become available.

As such, at block 404, the ICL 208 that provides the inter-aggregated-networking-device link may become available following the addition of the aggregated networking device 206b to the aggregated networking device domain 206. In response, at block 404 the aggregation manager engine 304 in the aggregated networking device 206a/300 may operate to establish the ICL 208 with the aggregated networking device 206b. As will be appreciated by one of skill in the art in possession of the present disclosure, at block 404, the aggregation manager engine 304 in the aggregated networking device 206a/300 may operate to establish the ICL 208 following the addition of the aggregated networking device 206b to the aggregated networking device domain 206 using a variety of ICL-establishment techniques known in the art. Furthermore, as discussed above, the ICL 208 provides a bi-directional communications channel and, as such, at block 404 the aggregation manager engine 304 in the aggregated networking device 206b/300 may also operate to establish the ICL 208 following its connection to the aggregated networking device domain 206 using a variety of ICL-establishment techniques known in the art as well. Thus, in some embodiments of block 404, the aggregated networking devices 206 and 206b may exchange a variety of ICL establishment communications known in the art, and/or perform a variety of ICL establishment operations known in the art, in order to establish the ICL 208 between them following the addition of the aggregated networking device 206b to the aggregated networking device domain 206.

Figure 5D:
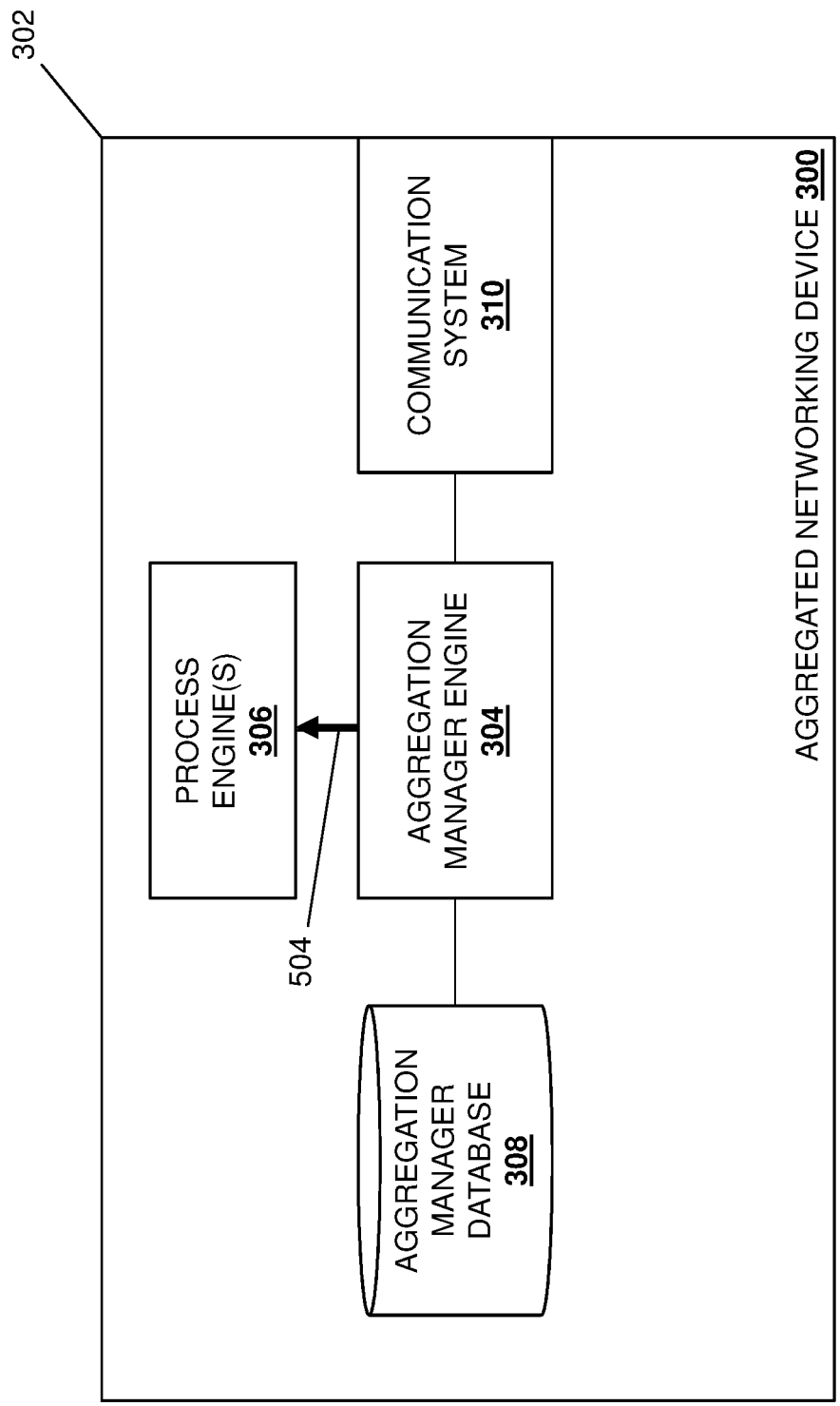
FIG. 5D is a schematic view illustrating an embodiment of the aggregated networking device of FIG. 3 operating during the method of FIG. 4.

The method 400 then proceeds to block 406 where the first aggregated networking device synchronizes first aggregated networking device process(es) running on the first aggregated networking device with respective corresponding second aggregated networking device process(es) running on the second aggregated networking device. In an embodiment, at block 406 and following the establishment of the ICL 208 in either of the embodiments discussed above, the aggregation manager engine 304 in the aggregated networking device 206a/300 may operate to cause the synchronization of processes provided by the process engine(s) 306 and running on the aggregated networking device 206a/300 with corresponding, respective processes provided by the process engine(s) 306 and running on the aggregated networking device 206b/300. For example, as illustrated in FIG. 5D, at block 406 and following the reestablishment/establishment of the bi-direction communication channel provided by the ICL 208, the aggregation manager engine 304 in the aggregated networking device 206a/300 may generate and transmit a synchronization initiation message 504 to the process engine(s) 306 that is configured to cause those process engine(s) 306 to initiate the synchronization of the processes that they provide with corresponding respective processes running on the aggregated networking device 206b.

For example, with reference to FIG. 5E, a plurality of specific process engines are illustrated as providing respective specific processes running on the aggregated networking devices 206a and 206b, respectively. In the specific example illustrated in FIG. 5E, the process engines in the aggregated networking device 206a include an aggregated manager engine 506a (which may be provided by the aggregated manager engine 304 included in the aggregated networking device 206a/300), a Media Access Control (MAC) address manager engine 506b, an Address Resolution Protocol (ARP) manager engine 506c, a multicast routing protocol engine 506d, and up to an aggregation Spanning Tree Protocol (xSTP) engine 506d. Similarly, the process engines in the aggregated networking device 206b include an aggregated manager engine 508a (which may be provided by the aggregated manager engine 304 included in the aggregated networking device 206b/300), a MAC address manager engine 508b, an ARP manager engine 508c, a multicast routing protocol engine 508d, and up to an aggregation Spanning Tree Protocol (xSTP) engine 508e. However, while a few specific process engines are illustrated, one of skill in the art in possession of the present disclosure will recognize that other process engines may be included in the aggregated networking devices 206a and 206b and may operate to provide other processes (e.g., the Internet Group Management Protocol (IGMP) snooping process and the Dynamic Host Configuration Protocol (DHCP) snooping process discussed above, as well as any other processes that would be apparent to one of skill in the art in possession of the present disclosure) while remaining within the scope of the present disclosure as well.

As will be appreciated by one of skill in the art in possession of the present disclosure, the aggregation manager engines 506a and 508a in the aggregated networking devices 206a and 206b, respectively, may operate to provide corresponding respective aggregation manager processes that run on each of the aggregated networking devices 206a and 206b, and that may operate to perform a variety of aggregation manager process operations known in the art. For example, in some embodiments, the TOR networking device 204 may be a dual-homed TOR switch device, which one of skill in the art in possession of the present disclosure will recognize may allow data packets to loop via the TOR networking device and the aggregated networking devices 206a and 206b, and thus the aggregated manager processes running on each of the aggregated networking devices 206a and 206b may operate to program their respective aggregated networking devices 206 and 206b to prevent such loops. However, while a specific aggregation manager process operation performed by the aggregated manager processes running on each of the aggregated networking devices 206 and 206b has been described, one of skill in the art in possession of the present disclosure will recognize that a variety of other aggregation manager process operations will fall within the scope of the present disclosure as well.

As will also be appreciated by one of skill in the art in possession of the present disclosure, the MAC address manager engines 506b and 508b in the aggregated networking devices 206a and 206b, respectively, may operate to provide corresponding respective MAC address manager processes that run on each of the aggregated networking devices 206a and 206b and that may operate to perform a variety of MAC address manager process operations known in the art. For example, in some embodiments, data packets received at the aggregated networking device 206a from the TOR networking device 204 may result in the programming of MAC addresses in the aggregated networking device 206a for the purposes of subsequent data packet forwarding of data packets associated with the same MAC address, and the MAC address manager processes running on each of the aggregated networking devices 206a and 206b may operate to perform MAC address manager process operations that include programming any MAC addresses that are programmed in the aggregated networking device 206a in the aggregated networking device 206b as well so that the aggregated networking device 206b may forward any data packets associated with the same MAC address in a similar manner. However, while a specific MAC address manager process operation performed by the MAC address manager processes running on each of the aggregated networking devices 206 and 206b has been described, one of skill in the art in possession of the present disclosure will recognize that a variety of other MAC address manager process operations will fall within the scope of the present disclosure as well.

As will also be appreciated by one of skill in the art in possession of the present disclosure, the ARP manager engines 506c and 508c in the aggregated networking devices 206a and 206b, respectively, may operate to provide corresponding respective ARP manager processes that run on each of the aggregated networking devices 206a and 206b and that may operate to perform a variety of ARP manager process operations known in the art. For example, in some embodiments, data packets received at the aggregated networking device 206a from the TOR networking device 204 may result in the programming of ARP information in the aggregated networking device 206a for the purposes of subsequent data packet forwarding of data packets associated with the same ARP information, and the ARP manager processes running on each of the aggregated networking devices 206a and 206b may operate to perform ARP manager process operations that include programming any ARP information that is programmed in the aggregated networking device 206a in the aggregated networking device 206b as well so that the aggregated networking device 206b may forward any data packets associated with the same ARP information in a similar manner. However, while a specific ARP manager process operation performed by the ARP manager processes running on each of the aggregated networking devices 206a and 206b has been described, one of skill in the art in possession of the present disclosure will recognize that a variety of other ARP manager process operations will fall within the scope of the present disclosure as well.

As will also be appreciated by one of skill in the art in possession of the present disclosure, the multicast routing protocol engines 506d and 508d in the aggregated networking devices 206a and 206b, respectively, may operate to provide corresponding respective multicast routing protocol processes that run on each of the aggregated networking devices 206a and 206b and that may operate to perform a variety of multicast routing protocol process operations known in the art. For example, in some embodiments, data packets received at the aggregated networking device 206a from the TOR networking device 204 may result in the programming of multicast routing information in the aggregated networking device 206a for the purposes of subsequent data packet forwarding of data packets associated with the same multicast routing information, and the multicast routing protocol processes running on each of the aggregated networking devices 206a and 206b may operate to perform multicast routing protocol process operations that include programming any multicast routing information that is programmed in the aggregated networking device 206a in the aggregated networking device 206b as well so that the aggregated networking device 206b may forward any data packets associated with the same multicast routing information in a similar manner. However, while a specific multicast routing protocol process operation performed by the multicast routing protocol processes running on each of the aggregated networking devices 206a and 206b has been described, one of skill in the art in possession of the present disclosure will recognize that a variety of other multicast routing protocol process operations will fall within the scope of the present disclosure as well.

As will also be appreciated by one of skill in the art in possession of the present disclosure, the aggregation xSTP engines 506e and 508e in the aggregated networking devices 206a and 206b, respectively, may operate to provide corresponding respective aggregation xSTP processes that run on each of the aggregated networking devices 206a and 206b and that may operate to perform a variety of aggregation xSTP process operations known in the art. For example, in some embodiments, an STP port state (e.g., a VLT STP port state) of ports on the aggregated networking devices 206a and 206b (e.g., the ports that provide the LAG 210 to the TOR networking device 204) may need to be identical, and when the ICL 208/VLTi between the aggregated networking devices 206a and 206b becomes unavailable and the ports on the aggregated networking device 206b that provide the second portion of the LAG 210 are brought down/disabled, the STP port state of the ports on the aggregated networking device 206a may change. As such, following the subsequent availability of the ICL 208/VLTi, the aggregation xSTP processes running on each of the aggregated networking devices 206a and 206b may operate to perform aggregation xSTP process operations that include providing the STP port state of the ports on the aggregated networking device 206a on the ports on the aggregated networking device 206b. However, while a specific aggregation xSTP process operation performed by the aggregation xSTP processes running on each of the aggregated networking devices 206a and 206b has been described, one of skill in the art in possession of the present disclosure will recognize that a variety of other aggregation xSTP process operations will fall within the scope of the present disclosure as well.

As such, with reference to FIG. 5E, at block 404 the aggregation manager engine 506a in the aggregated networking device 206a may operate to generate and transmit synchronization initiation messages 504 to the MAC address manager engine 506b, the ARP manager engine 506c, the multicast routing protocol engine 506d, and the aggregation xSTP engine 506e, with those synchronization initiation messages 504 configured to cause those process engines to initiate the synchronization of the processes that they provide with corresponding respective processes running on the aggregated networking device 206b. As such, with reference to FIG. 5F, following the receiving of the synchronization initiation message 504, the aggregation manager engine 506a may initiate process synchronization operations with the aggregation manager engine 508a such that the aggregation manager engines 506a and 508a in the aggregated networking devices 206 and 206b, respectively, operate to provide their corresponding respective aggregation manager processes that run on each of the aggregated networking devices 206 and 206b and that may operate to perform a variety of aggregation manager process synchronization operations known in the art. Thus, continuing with the example provided above, in some embodiments, the aggregation manager process synchronization operations may include the aggregated manager processes running on each of the aggregated networking devices 206a and 206b exchanging aggregation control messages 510a to program their respective aggregated networking devices 206a and 206b to prevent loops. However, while a specific aggregation manager process synchronization operation performed by the aggregated manager processes running on each of the aggregated networking devices 206a and 206b has been described, one of skill in the art in possession of the present disclosure will recognize that a variety of other aggregation manager process operations will fall within the scope of the present disclosure as well.

Figure 5F:
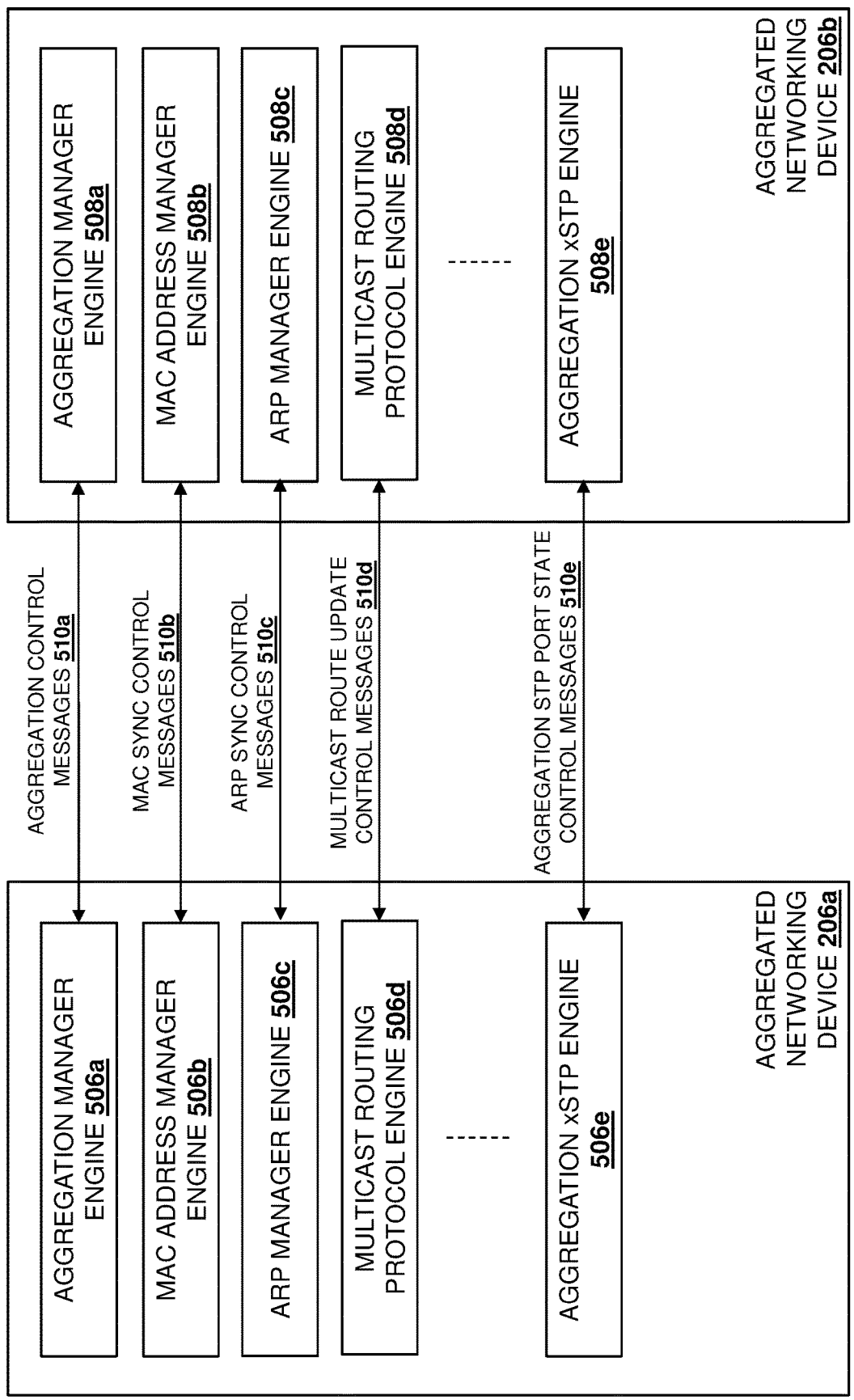
FIG. 5F is a schematic view illustrating an embodiment of aggregated networking devices in the networking aggregation link provisioning system of FIG. 2 operating during the method of FIG. 4.

Similarly, with reference to FIG. 5F, following the receiving of the synchronization initiation message 504, the MAC address manager engine 506b may initiate synchronization operations with the MAC address manager engine 508b such that the MAC address manager engines 506b and 508b in the aggregated networking devices 206a and 206b, respectively, operate to provide their corresponding respective MAC address manager processes that run on each of the aggregated networking devices 206a and 206b and that may operate to perform a variety of MAC address manager process synchronization operations known in the art. Thus, continuing with the example provided above, in some embodiments, the MAC address manager process synchronization operations may include the MAC address manager processes running on each of the aggregated networking devices 206a and 206b exchanging MAC synchronization control messages 510b to provide for the programming of any MAC addresses that are programmed in the aggregated networking device 206a in the aggregated networking device 206b as well. However, while a specific MAC address manager process synchronization operation performed by the MAC address manager processes running on each of the aggregated networking devices 206a and 206b has been described, one of skill in the art in possession of the present disclosure will recognize that a variety of other MAC address manager process operations will fall within the scope of the present disclosure as well Similarly, with reference to FIG. 5F, following the receiving of the synchronization initiation message 504, the ARP manager engine 506c may initiate synchronization operations with the ARP manager engine 508c such that the ARP manager engines 506c and 508c in the aggregated networking devices 206a and 206b, respectively, operate to provide their corresponding respective ARP manager processes that run on each of the aggregated networking devices 206a and 206b and that may operate to perform a variety of ARP manager process synchronization operations known in the art. Thus, continuing with the example provided above, in some embodiments, the ARP manager process synchronization operations may include the ARP manager processes running on each of the aggregated networking devices 206a and 206b exchanging ARP synchronization control messages 510c to provide for the programming of any ARP information that is programmed in the aggregated networking device 206a in the aggregated networking device 206b as well. However, while a specific ARP manager process synchronization operation performed by the ARP manager processes running on each of the aggregated networking devices 206a and 206b has been described, one of skill in the art in possession of the present disclosure will recognize that a variety of other ARP manager process operations will fall within the scope of the present disclosure as well.

Similarly, with reference to FIG. 5F, following the receiving of the synchronization initiation message 504, the multicast routing protocol engine 506d may initiate synchronization operations with the multicast routing protocol engine 508d such that the multicast routing protocol engines 506d and 508d in the aggregated networking devices 206a and 206b, respectively, operate to provide their corresponding respective multicast routing protocol processes that run on each of the aggregated networking devices 206a and 206b and that may operate to perform a variety of multicast routing protocol process synchronization operations known in the art. Thus, continuing with the example provided above, in some embodiments, the multicast routing protocol process synchronization operations may include the multicast routing protocol processes running on each of the aggregated networking devices 206a and 206b exchanging multicast route update control messages 510d to provide for the programming of any multicast routing information that is programmed in the aggregated networking device 206a in the aggregated networking device 206b as well. However, while a specific multicast routing protocol process synchronization operation performed by the multicast routing protocol processes running on each of the aggregated networking devices 206a and 206b has been described, one of skill in the art in possession of the present disclosure will recognize that a variety of other multicast routing protocol process operations will fall within the scope of the present disclosure as well.

Similarly, with reference to FIG. 5F, following the receiving of the synchronization initiation message 504, the aggregation xSTP engine 506e may initiate synchronization operations with the aggregation xSTP engine 508e such that the aggregation xSTP engines 506e and 508e in the aggregated networking devices 206a and 206b, respectively, operate to provide their corresponding respective aggregation xSTP processes that run on each of the aggregated networking devices 206a and 206b and that may operate to perform a variety of aggregation xSTP process synchronization operations known in the art. Thus, continuing with the example provided above, in some embodiments, the aggregation xSTP process synchronization operations may include the aggregation xSTP processes running on each of the aggregated networking devices 206a and 206b exchanging aggregation STP port state control messages 510e to provide the STP port state of the ports on the aggregated networking device 206a on the ports on the aggregated networking device 206b. However, while a specific aggregation xSTP process synchronization operation performed by the aggregation xSTP processes running on each of the aggregated networking devices 206a and 206b has been described, one of skill in the art in possession of the present disclosure will recognize that a variety of other aggregation xSTP process operations will fall within the scope of the present disclosure as well. Furthermore, one of skill in the art in possession of the present disclosure will appreciate that the process synchronization operations (e.g., the aggregation manager process synchronization operations, the MAC address manager process synchronization operations, the ARP manager process synchronization operations, the multicast routing protocol synchronization operations, the aggregation xSTP synchronization operations, and/or any other process synchronization operations) may be performed by the respective process engines 306 in parallel while remaining within the scope of the present disclosure as well.

The method 400 then proceeds to decision block 408 where it is determined whether the process synchronization has completed. In an embodiment, at decision block 408, the aggregation manager engine 304 in the aggregated networking device 206a/300 may operate to determine whether the process synchronization operations being performed by the process engine(s) 306 (e.g., which provide the process(es) running on the aggregated networking device 206a) have been completed. For example, each of the process engine(s) 306 may be configured to generate and transmit a synchronization complete message to the aggregation manager engine 304 following the completion of their process synchronization operations in order to notify the aggregation manager engine 304 that their respective process synchronization operations have been completed. As such, in some embodiments, the aggregation manager engine 304 in the aggregated networking device 206a/300 may operate at decision block 408 to determine whether synchronization complete messages have been received from all of the process engines 306 (e.g., the aggregation manager engine 506a, the MAC address manager engine 506b, the ARP manager engine 506c, the multicast routing protocol engine 506d, and the aggregation xSTP engine 506e discussed in the specific example above) that operated to perform process synchronization operations at block 406.

However, in some embodiments, the aggregation manager engine 304 in the aggregated networking device 206a/300 may operate at decision block 408 to determine whether synchronization complete messages have been received from a subset of the process engines 306 that operated to perform process synchronization operations at block 406. For example, in some embodiment, at decision block 408 the aggregation manager engine 304 in the aggregated networking device 206a/300 may operate to determine whether synchronization complete messages have been received from process engines 306 that provide processes that are considered "mandatory" with regard to providing the LAG 210 (i.e., processes that must be synchronized across the aggregated networking devices 206a and 206b in order for the aggregated networking device 206b to provide the second portion of the LAG 210 to the TOR networking device 204.) Continuing with the specific example provided above, the MAC address manager process provided by the MAC address manager engine 506b, the ARP manager process provided by the ARP manager engine 506c, and the multicast routing protocol process provided by the multicast routing protocol engine 506d may be considered mandatory with regard to providing the LAG 210, and thus the aggregation manager engine 304 in the aggregated networking device 206a/300 may operate to determine whether synchronization complete messages have been received from the MAC address manager engine 506b, the ARP manager engine 506c, and the multicast routing protocol engine 506d at decision block 408. As will be appreciated by one of skill in the art in possession of the present disclosure, processes that are not considered mandatory (e.g., the aggregation xSTP process provided by the aggregation xSTP engine 506e, the IGMP snooping process, and the DHCP snooping process discussed above) may continue and/or complete process synchronization operations during and/or subsequent to the provisioning of the LAG 210 with the TOR networking device 204.

If, at decision block 408, it is determined that the process synchronization has not completed, the method 400 returns to block 406. For example, at decision block 408, the aggregation manager engine 304 in the aggregated networking device 206a/300 may operate at decision block 408 to determine that synchronization complete messages have not been received from all of the process engines 306, or the subset of process engines 306 that provide "mandatory" processes as discussed above and, in response, the method 400 may return to block 406. As such, the method 400 may loop through block 406 and decision block 408 such that the aggregated networking device 206a synchronizes process(es) running on the aggregated networking device 206a with respective corresponding process(es) running on the aggregated networking device 206b until it is determined that those process synchronization operations have been completed.

Figure 5G:
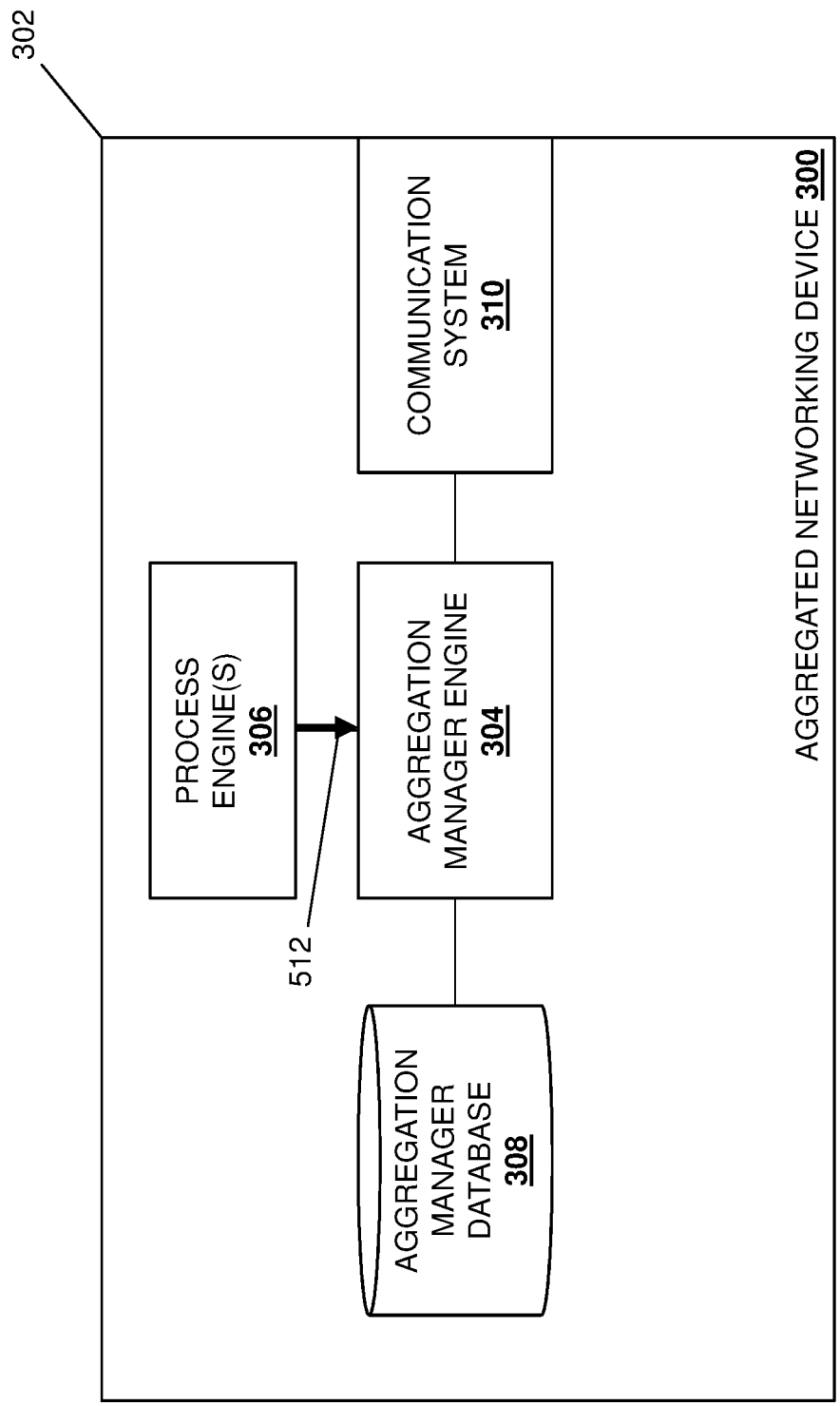
FIG. 5G is a schematic view illustrating an embodiment of the aggregated networking device of FIG. 3 operating during the method of FIG. 4.

If at decision block 408, it is determined that the process synchronization has completed, the method 400 proceeds to block 410 where the first aggregated networking device causes the second aggregated networking device to enable a second portion of the link aggregation to the connected device. In an embodiment, at decision block 408, the aggregation manager engine 304 in the aggregated networking device 206a/300 may operate at decision block 408 to determine that synchronization complete messages have been received from all of the process engines 306, or the subset of process engines 306 that provide "mandatory" processes as discussed above and, in response, the method 400 may proceed to block 410. For example, as illustrated in FIG. 5G, in response to completing process synchronization operations, any of the process engine(s) 306 may generate and transmit process synchronization complete message(s) 512 to the aggregation manager engine 304 in the aggregated networking device 206a/300 such that the aggregation manager engine 304 in the aggregated networking device 206a/300 determines that the process synchronization operations being performed by those process engines 306 have completed.

As such, with reference to FIG. 5H, each of the MAC address manager engine 506b, the ARP manager engine 506c, the multicast routing protocol engine 506d, and the aggregation xSTP engine 506e may transmit respective process synchronization complete messages 512 to the aggregation manager engine 506a such that the aggregation manager engine 304/506a in the aggregated networking device 206a/300 determines that their respective process synchronization operations have completed. However, as discussed above, at decision block 408 the method 400 may proceed to block 410 in response to the aggregation manager engine 506a receiving process synchronization complete messages 512 from only the process engines (e.g., the MAC address manager engine 506b, the ARP manager engine 506c, and the multicast routing protocol engine 506d) that provide "mandatory" processes.

Figure 5I:
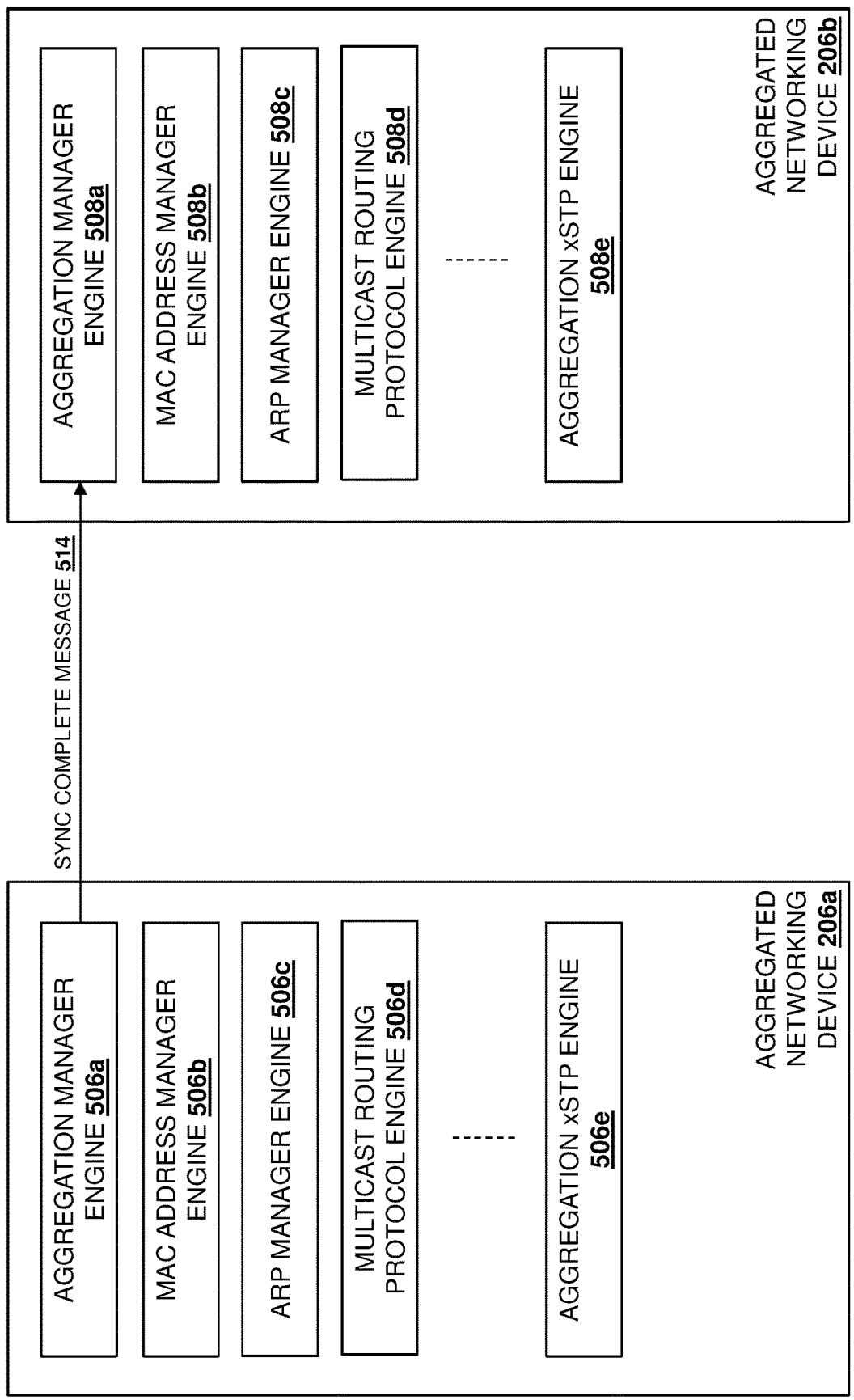
FIG. 5I is a schematic view illustrating an embodiment of aggregated networking devices in the networking aggregation link provisioning system of FIG. 2 operating during the method of FIG. 4.
Figure 5J:
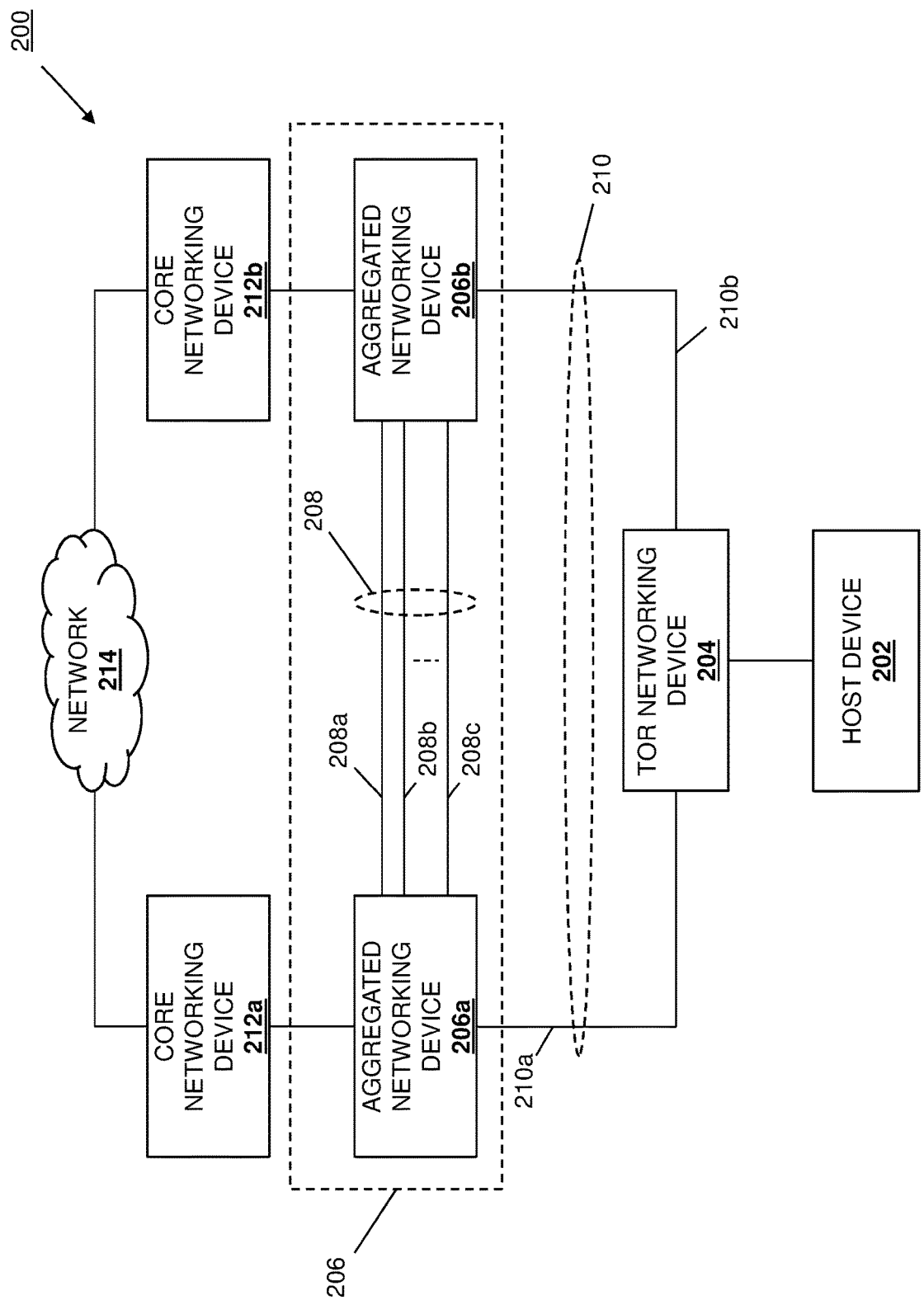
FIG. 5J is a schematic view illustrating an embodiment of the networking aggregation link provisioning system of FIG. 2 operating during the method of FIG. 4.

With reference to FIG. 5I, at block 410 and in response to determining that process synchronization operations have been completed, the aggregation manager engine 304 in the aggregated networking device 206a/300 may generate and transmit a process synchronization complete message 514 to the aggregation manager engine 508a in the aggregated networking device 206b. For example, the synchronization complete message 514 may include an instruction for the aggregation manager engine 304 in the aggregated networking device 206b/300 to enable the link(s) 210b that provide the second portion of the LAG 210 (e.g., to "bring up" the VLT ports/VLT port channel interfaces on the secondary VLT peer device that provide the second portion of the VLT LAG.) As such, with reference to FIG. 5J, at block 410 the aggregation manager engine 304 in the aggregated networking device 206b may receive the synchronization complete message 514 and in response, may enable, "bring up", and/or otherwise make available the link 210b that provides the second portion of the LAG 210. Thus, following block 410, data may be transmitted between the TOR networking device 204 and the aggregated networking device domain 206 via the LAG 210, and one of skill in the art in possession of the present disclosure will recognize that the process synchronization operations performed as discussed above with ensure that the aggregated networking device 206b operates properly in providing the second portion of that LAG 210. Furthermore, as discussed above, in some embodiments "non-mandatory" processes may continue and complete process synchronization operations subsequent to the availability of the LAG 210.

In some embodiments, the aggregated networking device 206a may be unable to instruct the aggregated networking device 206b to enable the link 210b that provides the second portion of the LAG 210. For example, subsequent to becoming available, the ICL 208 may once again become unavailable, which may prevent the aggregated networking device 206a from instructing the aggregated networking device 206b to enable the link(s) 210b. In order to address such situations, the aggregated networking device 206b may operate to begin a timer (e.g., upon being added to the aggregated networking device domain 206), and may then operate to determine whether the aggregated networking device 206a is detected within a time period. In the event the aggregated networking device 206a in not detected within the time period, the aggregated networking device 206b may operate to promote itself to operating as the primary aggregated networking device (e.g., the primary VLT peer device), and enable the link(s) 210b (e.g., its VLT ports) to the TOR networking device 204.

In another example, the aggregation manager engine 304 in the aggregated networking device 206a may not receive process synchronization messages from one or more processes (or from one or more "mandatory" processes) performing process synchronization operations, which may prevent the aggregated networking device 206a from instructing the aggregated networking device 206b to enable the link(s) 210b. In order to address such situations, the aggregation manager engine 304 in the aggregated networking device 206a may start a process synchronization timer after instructing its processes to begin process synchronization operations, and may then determine when process synchronization messages have not been received from one or more processes (or from one or more "mandatory" processes) performing process synchronization operations after some time period (e.g., 180 seconds) and, in response, may send an instruction to the aggregated networking device 206b to enable the link(s) 210b (e.g., its VLT ports) to the TOR networking device 204. In some embodiments, the processes running on the aggregated networking device 206a (e.g., "mandatory" processes such as those discussed above) may be configured to send messages to the aggregation manger engine 304 in the aggregated networking device 206a to indicate that its process synchronization operations have begin, that its process synchronization operations are in progress, and that its process synchronization operations have completed, and the process synchronization timer utilized by the aggregation manager engine 304 may be adjusted based on those process status messages.

Thus, systems and methods have been described that provide for the provisioning of links between a VLT domain and a TOR switch device via a deterministic synchronization of processes running in VLT peer devices that provide the VLT domain. For example, a VLT domain may include a primary VLT peer device that is configured to provide a first portion of a VLT LAG to a TOR switch device, and a secondary VLT peer device that is coupled to the primary VLT peer device and that is configured to provide a second portion of the VLT LAG to the TOR switch device. The primary VLT peer device may establish an ICL/VLTi with the secondary VLT peer device and, in response, synchronize at least one process running in the primary VLT peer device with a respective corresponding process running in the secondary VLT peer device. When the primary VLT peer device determines that the synchronization of the at least one process with the respective corresponding process has completed, it may cause the secondary VLT peer device to enable the second portion of the VLT LAG to the TOR switch device. As such, the second portion of the VLT LAG to the TOR switch device may be enabled as soon as synchronization operations for processes running on the primary and secondary VLT peers devices are completed and without the need for the user intervention discussed above to determine the time needed for those synchronization operations to complete, thus ensuring proper operation of the VLT domain without reducing bandwidth available via the VLT LAG for longer than is necessary.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for providing networking aggregation links, comprising:
    providing, by a first aggregated networking device, a first portion of a link aggregation to a connected device;
    establishing, by the first aggregated networking device with a second aggregated networking device following an unavailability of an inter-aggregated-networking-device link that caused the second aggregated networking device to disable a second portion of the link aggregation to the connected device, the inter-aggregated-networking-device link;
    synchronizing, by the first aggregated networking device with the second aggregated networking device in response to establishing the inter-aggregated-networking-device link, at least one first aggregated networking device process running in the first aggregated networking device with a respective corresponding second aggregated networking device process running in the second aggregated networking device; and
    determining, by the first aggregated networking device and in response to receiving a synchronization complete message for each of the at least one first aggregated networking device process from the respective corresponding second aggregated networking device process when that respective corresponding second aggregated networking device process completes synchronization, that the synchronization of the at least one first aggregated networking device process with the respective corresponding second aggregated networking device process has completed and, in response, causing the second aggregated networking device to enable a second portion of the link aggregation to the connected device.

2. The method of claim 1, wherein the establishing the inter-aggregated-networking-device link with the second aggregated networking device is performed following the coupling of the second aggregated networking device to the processing system.

3. The method of claim 1, wherein the at least one first aggregated networking device process includes a plurality of first networking device processes that are synchronized with respective corresponding second aggregated networking device processes running in the second aggregated networking device, and wherein the method further comprises:
    determining, by the first aggregated networking device, that the synchronization of a subset of the plurality of first aggregated networking device processes with the respective corresponding second aggregated networking device processes has completed and, in response, cause the second aggregated networking device to enable the second portion of the link aggregation to the connected device.

4. The method of claim 3, wherein the subset of the plurality of first aggregated networking device processes include first aggregated networking device processes that must be synchronized with the respective corresponding second aggregated networking device processes in order for the second aggregated networking device to provide the second portion of the link aggregation to the connected device.

5. The method of claim 1, wherein the at least one first networking device process includes at least one of a Media Access Control (MAC) address process, an Address Resolution Protocol (ARP) process, and a multicast routing process.

6. The method of claim 1, wherein the causing the second aggregated networking device to enable the second portion of the link aggregation to the connected device includes:
    transmitting, by the first aggregated networking device, an instruction to the second aggregated networking device to enable the second portion of the link aggregation to the connected device.

7. A networking aggregation link provisioning system, comprising:
    a second aggregated networking device that is configured to provide a second portion of a link aggregation to a connected device; and
    a first aggregated networking device that is coupled to the second aggregated networking device and that is configured to provide a first portion of the link aggregation to the connected device, wherein the first aggregated networking device is configured to:
        establish, with the second aggregated networking device following an unavailability of an inter-aggregated-networking-device link that caused the second aggregated networking device to disable the second portion of the link aggregation to the connected device, the inter-aggregated-networking-device link;

synchronize, with the second aggregated networking device in response to establishing the inter-aggregated-networking-device link, at least one first aggregated networking device process running in the first aggregated networking device with a respective corresponding second aggregated networking device process running in the second aggregated networking device; and determine, in response to receiving a synchronization complete message for each of the at least one first aggregated networking device process from the respective corresponding second aggregated networking device process when that respective corresponding second aggregated networking device process completes synchronization, that the synchronization of the at least one first aggregated networking device process with the respective corresponding second aggregated networking device process has completed and, in response, cause the second aggregated networking device to enable the second portion of the link aggregation to the connected device.

8. The system of claim 7, wherein the establishing the inter-aggregated-networking-device link with the second aggregated networking device is performed by the first aggregated networking device following the coupling of the second aggregated networking device to the first aggregated networking device.

9. The system of claim 7, wherein the at least one first aggregated networking device process includes a plurality of first networking device processes that are synchronized with respective corresponding second aggregated networking device processes running in the second aggregated networking device, and wherein the first aggregated networking device is configured to:

determine that the synchronization of a subset of the plurality of first aggregated networking device processes with the respective corresponding second aggregated networking device processes has completed and, in response, cause the second aggregated networking device to enable the second portion of the link aggregation to the connected device.

10. The system of claim 9, wherein the subset of the plurality of first aggregated networking device processes include first aggregated networking device processes that must be synchronized with the respective corresponding second aggregated networking device processes in order for the second aggregated networking device to provide the second portion of the link aggregation to the connected device.

11. The system of claim 7, wherein the at least one first aggregated networking device process includes at least one of a Media Access Control (MAC) address process, an Address Resolution Protocol (ARP) process, and a multicast routing process.

12. An Information Handling System (IHS), comprising:
a processing system; and
a memory system that is coupled to the processing system and that includes instructions that, when executed by the processing system, cause the processing system to provide an aggregation manager engine that is configured to:

provide a first portion of a link aggregation to a connected device;

establish, with an aggregated networking device following an unavailability of an inter-aggregated-networking-device link that caused the aggregated networking device to disable a second portion of the link aggregation to the connected device, the inter-aggregated-networking-device link;

synchronize, with the aggregated networking device in response to establishing the inter-aggregated-networking-device link, at least one first aggregated networking device process run by the processing system with a respective corresponding second aggregated networking device process running in the second aggregated networking device; and determine, in response to receiving a synchronization complete message for each of the at least one first aggregated networking device process from the respective corresponding second aggregated networking device process when that respective corresponding second aggregated networking device process completes synchronization, that the synchronization of the at least one first aggregated networking device process with the respective corresponding second aggregated networking device process has completed and, in response, cause the second aggregated networking device to enable a second portion of the link aggregation to the connected device.

13. The IHS of claim 12, wherein the establishing the inter-aggregated-networking-device link with the second aggregated networking device is performed following the coupling of the second aggregated networking device to the processing system.

14. The IHS of claim 12, wherein the at least one first aggregated networking device process includes a plurality of first networking device processes that are synchronized with respective corresponding second aggregated networking device processes running in the second aggregated networking device, and wherein the aggregation manager engine is configured to:

determine that the synchronization of a subset of the plurality of first aggregated networking device processes with the respective corresponding second aggregated networking device processes has completed and, in response, cause the second aggregated networking device to enable the second portion of the link aggregation to the connected device.

15. The IHS of claim 14, wherein the subset of the plurality of first aggregated networking device processes include first aggregated networking device processes that must be synchronized with the respective corresponding second aggregated networking device processes in order for the second aggregated networking device to provide the second portion of the link aggregation to the connected device.

16. The IHS of claim 12, wherein the at least one first networking device process includes at least one of a Media Access Control (MAC) address process, an Address Resolution Protocol (ARP) process, and a multicast routing process.

17. The IHS of claim 12, wherein the causing the second aggregated networking device to enable the second portion of the link aggregation to the connected device includes:

transmitting an instruction to the second aggregated networking device to enable the second portion of the link aggregation to the connected device.

* * * * *